United States Patent
McCowin et al.

[11] Patent Number: 5,127,139
[45] Date of Patent: Jul. 7, 1992

[54] STRINGER CLIP END EFFECTOR

[75] Inventors: Peter D. McCowin, Enumclaw; Hugh R. Schlosstein, Renton, both of Wash.

[73] Assignee: The Boeing Company, Seattle, Wash.

[21] Appl. No.: 682,622

[22] Filed: Apr. 8, 1991

[51] Int. Cl.$^5$ .............................................. B23B 41/00
[52] U.S. Cl. ....................... 29/26 A; 408/19; 408/37; 408/79; 408/108; 901/31; 901/41
[58] Field of Search ............. 408/19, 37, 51, 62, 408/79, 95, 103, 108, 234; 29/33 K, 34 B, 26 A, 281.5; 901/31, 37, 41; 227/58, 69, 70; 414/729

[56] References Cited

U.S. PATENT DOCUMENTS

| | | | |
|---|---|---|---|
| 3,758,933 | 9/1973 | Gross | 29/200 |
| 3,807,889 | 4/1974 | Kiezel | 408/108 |
| 3,877,129 | 4/1975 | Dobson et al. | 29/200 |
| 4,215,958 | 8/1980 | Jägers | 408/51 |
| 4,216,572 | 8/1980 | Matsushita et al. | 29/568 |
| 4,428,256 | 1/1984 | Ida et al. | 74/820 |
| 4,486,128 | 12/1984 | Baker et al. | 408/37 |
| 4,627,785 | 12/1986 | Monforte | 414/730 |
| 4,897,000 | 1/1990 | Juzuki | 408/79 |
| 4,995,148 | 2/1991 | Bonomi et al. | 29/26 A |
| 5,060,362 | 10/1991 | Birke et al. | 29/348 |

FOREIGN PATENT DOCUMENTS 138412 10/1979 Fed. Rep. of Germany.

Primary Examiner—Daniel W. Howell
Attorney, Agent, or Firm—Christensen, O'Connor, Johnson & Kindness

[57] ABSTRACT

A stringer clip end effector (21) suitable for use with a computer-controlled (CC) machine tool is disclosed. The stringer clip end effector (21) includes a pair of jaws (45,47) for picking up a clip (23) at a presentation location. After being moved by the CC machine tool to an insertion location adjacent to a hat-shaped stringer (31), a pair of cams (60a, 60b) located on opposite sides of the clip (23) are extended into the stringer cavity (25) and rotated to spread the stringer walls (27,29). Thereafter, the clip (23) is positioned in the stringer cavity (25). Then, the cams (60a, 60b) are rotated to a non-spread position, and clamp elements (49a, 49b, 51a, 51b) are actuated to press the walls (27, 29) of the stringer (31) against the clip (23). Next, drill bits (57a, 57b, 59a, 59b) that face the outer surface of the stringer walls (27, 29) are energized and moved toward the stringer walls. After holes are drilled through the stringer walls and the clip, the drill bits are withdrawn. Thereafter, the clip (23) is either released while lying between the walls of the stringer (31), or withdrawn from the stringer (31) and moved to a temporary storage location.

34 Claims, 17 Drawing Sheets

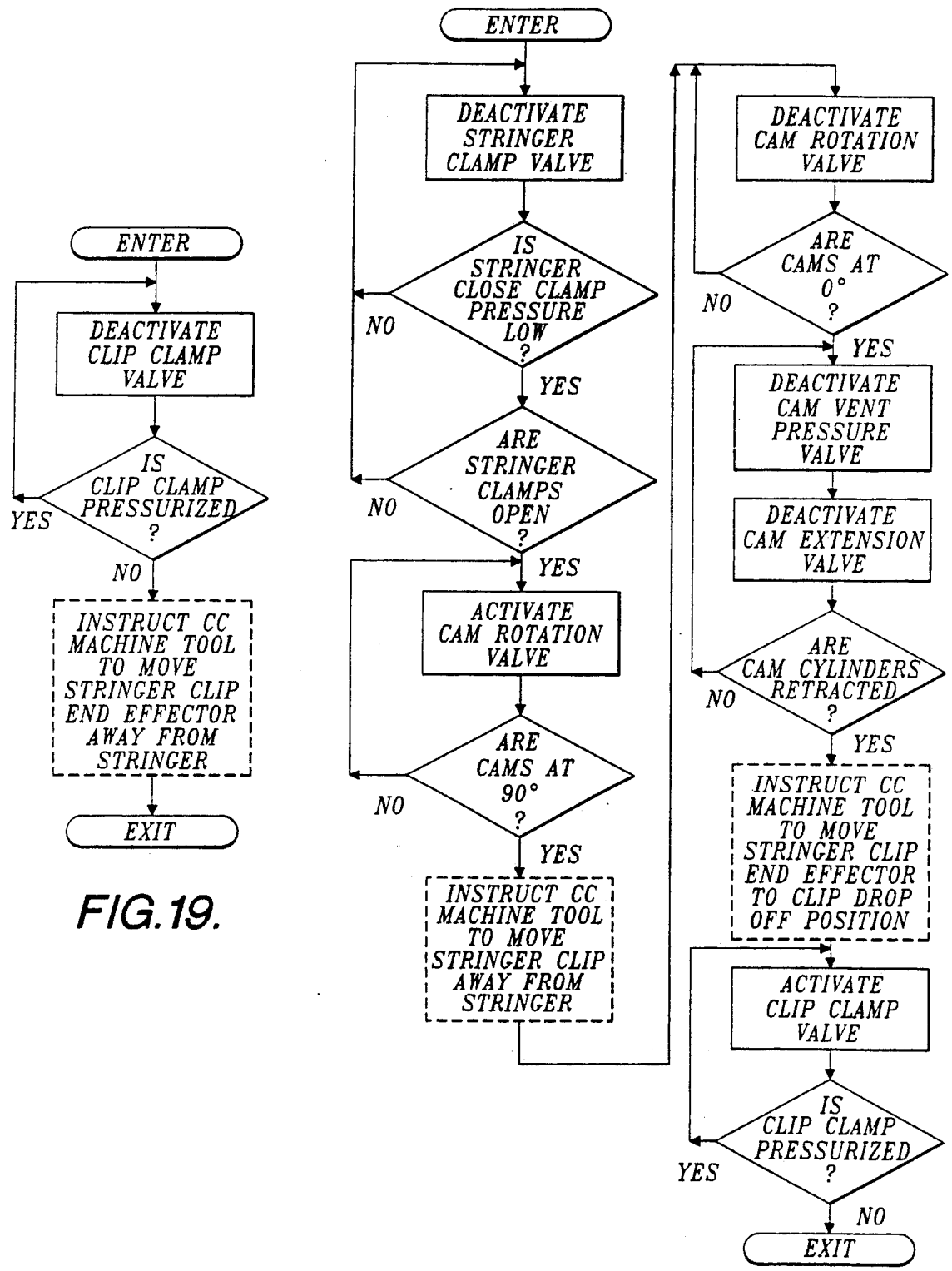

STRINGER CLIP END EFFECTOR

TECHNICAL AREA

This invention is directed to computer-controlled (CC) machine tools and, more particularly, to end effectors for CC machine tools.

BACKGROUND OF THE INVENTION

While the present invention was developed for use in positioning clips in stringers utilized in aircraft structures, and drilling holes in the resulting assembly, it is to be understood that the invention can be utilized in other environments.

Currently, during aircraft stringer assembly, aircraft stringers are loaded onto stringer drilling machines. The stringer drilling machine drills pilot holes equal in number to the number required by the clips that are to be attached to the stringers. Normally, four holes are drilled. The drilled stringers are then loaded onto a tool and positioned. Next, clips are positioned by hand with respect to "hard points" associated with the tool. Using the pilot holes previously drilled in the stringers, attachment holes are drilled through the stringers and the clips. This procedure is time-consuming, costly, and subject to inaccuracies. The procedure is time-consuming and, thus, expensive due to the number of manual steps involved. The inaccuracy disadvantage comes from various sources—inaccurate placement of the clips in the stringers, which is primarily related to the tooling; and the manual drilling of the clip/stringer attachment holes through the pilot holes.

The present invention is directed to overcoming the foregoing and other disadvantages. More specifically, the present invention is directed to providing an end effector suitable for use with a computer-controlled machine tool for automatically positioning clips in stringers and drilling attachment holes in the clip/stringer assembly.

SUMMARY OF THE INVENTION

In accordance with this invention, an end effector suitable for use with a computer-controlled (CC) machine tool is provided. The end effector includes jaws for picking up a clip at a presentation location. The end effector also includes a pair of roller cams located on opposite sides of the jaws for extending the walls of a hat-shaped stringer prior to extending a clip held by the jaws into the stringer cavity. The end effector further includes clamps for pressing the walls of the stringer against the clip after the roller cams have been moved to a nonspread position. The end effector also includes drills and a drill feeding mechanism. The drills and drill feeding mechanism are positioned to drill holes through the walls of a stringer and a clip mounted between the stringer walls.

In accordance with further aspects of this invention, the end effector includes a program, which may form a portion of the program that controls the computer-controlled machine tool. The end effector program causes the jaws of the end effector to grip a clip after the end effector has been moved by the CC machine tool to a presentation location. After being moved by the CC machine tool to an insertion position located adjacent to a hat-shaped stringer, the end effector program causes the cams located on opposite sides of the jaws, and thus on opposite sides of the clip, to extend into the stringer cavity and spread the walls of the stringer. Thereafter, the end effector program causes the clip to be positioned in the stringer cavity. Next, the end effector program causes the cams to return to a nonspread position. Then, the end effector program causes the clamps to be actuated and press the walls of the stringer against the clip. Next, the end effector program causes the drills to be energized and moved toward the stringer walls. After holes are drilled through the stringer walls and the clip, the end effector program causes the drills to be withdrawn and the clip to be either released while lying between the walls of the stringer or withdrawn from the stringer and moved to a temporary storage location.

In accordance with other aspects of this invention, the end effector mechanisms, except for the drill feed mechanism, are pneumatically actuated.

In accordance with still other aspects of this invention, the clamps that grip the walls of the stringer are free-floating, resulting in equal pressure being applied to opposite walls of the stringer when the stringer is clamped.

In accordance with yet still other aspects of this invention, the jaws are controlled by a toggle linkage that creates a strong clip gripping force.

As will be readily appreciated from the foregoing description, the invention provides an end effector suitable for positioning clips between the walls of a stringer and automatically drilling holes through the stringer walls and the clips. Because the end effector is used in combination with a computer-controlled machine tool, the accurate positioning of stringer clips is readily repeated without human intervention. Because holes are simultaneously drilled through the walls of a stringer and a clip, accurate registration is accomplished, again without manual intervention. The end result is an accurate mechanism that requires little manual input and, thus, is faster and less expensive than the prior procedures described above.

BRIEF DESCRIPTION OF THE DRAWINGS

The foregoing and other advantages of this invention will become more readily appreciated as the same becomes better understood by reference to the following detailed description when taken in conjunction with the accompanying drawings wherein:

FIG. 19 is a flow diagram of the withdraw end effector portion of the program illustrated in FIG. 15; and FIG. 20 is a flow diagram of an alternate way of performing the withdraw end effector portion of the program illustrated in FIG. 15.

DESCRIPTION OF THE PREFERRED EMBODIMENT

Figure 1:
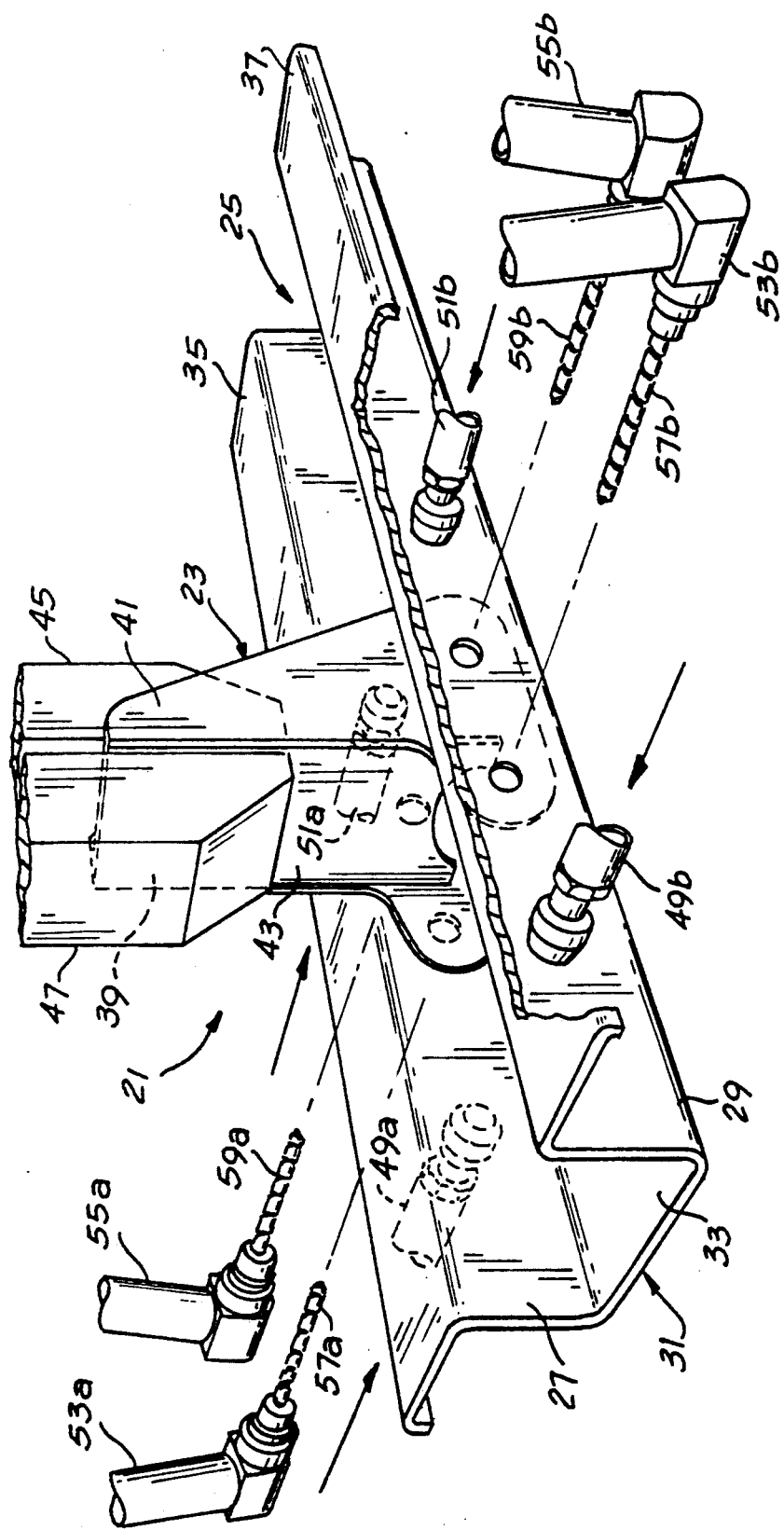
FIG. 1 is a pictorial view illustrating the end elements of some of the major mechanisms of a stringer clip end effector formed in accordance with the invention.
Figure 2:
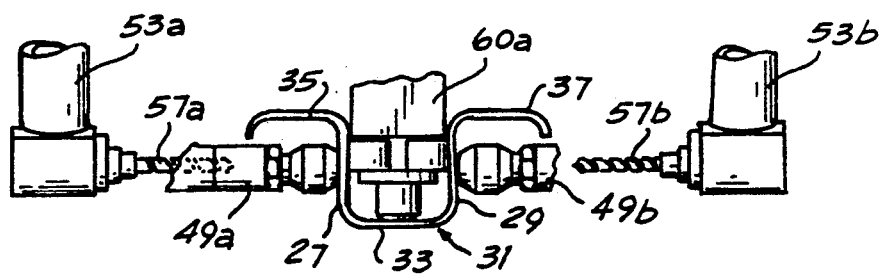
FIG. 2 is an end elevational view of some of the major mechanisms of a stringer clip end effector formed in accordance with the invention.

As pictorially illustrated in FIG. 1, a stringer clip end effector 21, formed in accordance with the invention, automatically inserts a clip 23 in the cavity 25 formed between the walls 27 and 29 of a hat-shaped stringer 31. As well known to those skilled in the aircraft structure and other arts, a hat-shaped stringer 31 has a U-shaped cross-sectional configuration formed by the walls 27 and 29 and a bottom 33. Extending outwardly from the walls 27 and 29 are flanges 35 and 37. The specific clip 23 illustrated in FIGS. 1 and 2 to be inserted in the cavity 25 between the walls 27 and 29 of the hat-shaped stringer 31 includes a pair of spaced-apart, generally triangular-shaped walls 39 and 41 joined by integral web 43 that lies along one edge of the walls 39 and 41. The clip is inserted such that the plane of the web 43 lies generally orthogonal to the plane of the bottom 33 of the hat-shaped stringer 31 and orthogonal to the walls 27 and 29.

The end effector 21 includes a pair of jaws 45 and 47 designed to grip the web 43 of the clip 23. As shown in FIG. 1, the end effector also includes two sets of clamp elements 49a and 49b and 51a and 51b located on opposite sides of the point where the clip 23 is to be inserted into the cavity 25 in the hat-shaped stringer 31. The sets of clamp elements 49a and 49b and 51a and 51b are positioned to press against the outer surfaces of the walls 27 and 29. As a result, when actuated, the clamp elements press the inner surfaces of the walls 27 and 29 against the outer surfaces of the triangular-shaped walls 39 and 41 of the clip 23.

A stringer clip end effector formed in accordance with the invention also includes a plurality of drills, preferably in pairs 53a and 53b and 55a and 55b. The drills 53a, 53b, 55a, and 55b are postioned so as to be located inwardly from the sets of clamp elements 49a and 49b and 51a and 51b in alignment with a clip 23 suitably positioned in the cavity 25 between the walls 27 and 29 of the hat-shaped stringer 31. The drills 53a, 53b, 55a, and 55b are positioned such that the bits 57a, 57b, 59a, and 59b of the drills lie orthogonal to and face the outer surfaces of the walls 27 and 29. After the drills are energized, a feed mechanism not illustrated in FIG. 1 moves the drill bits toward one another, resulting in aligned holes being drilled through the walls 27 and 29 of the hat-shaped stringer 31 and through the walls 39 and 41 of the clip 23.

In addition to the mechanisms illustrated in FIG. 1 and described above, preferably, as shown in FIG. 2, a stringer clip end effector formed in accordance with the invention also includes a pair of roller cams 60a and 60b for spreading the walls 27 and 29 of the hat-shaped stringer 31 outwardly, if necessary, so that the space between the walls is adequate to receive a clip 23. In this regard, the cams are located on opposite sides of the position where the clip is to be inserted, preferably outwardly from the sets of clamp elements 49a and 49b and 51a and 51b. After the clip is inserted, the cams allow the walls 27 and 29 of the hat-shaped stringer 31 to be pressed inwardly by the sets of clamp elements 49a and 49b and 51a and 51b against the walls 39 and 41 of the clip 23.

Figure 11:
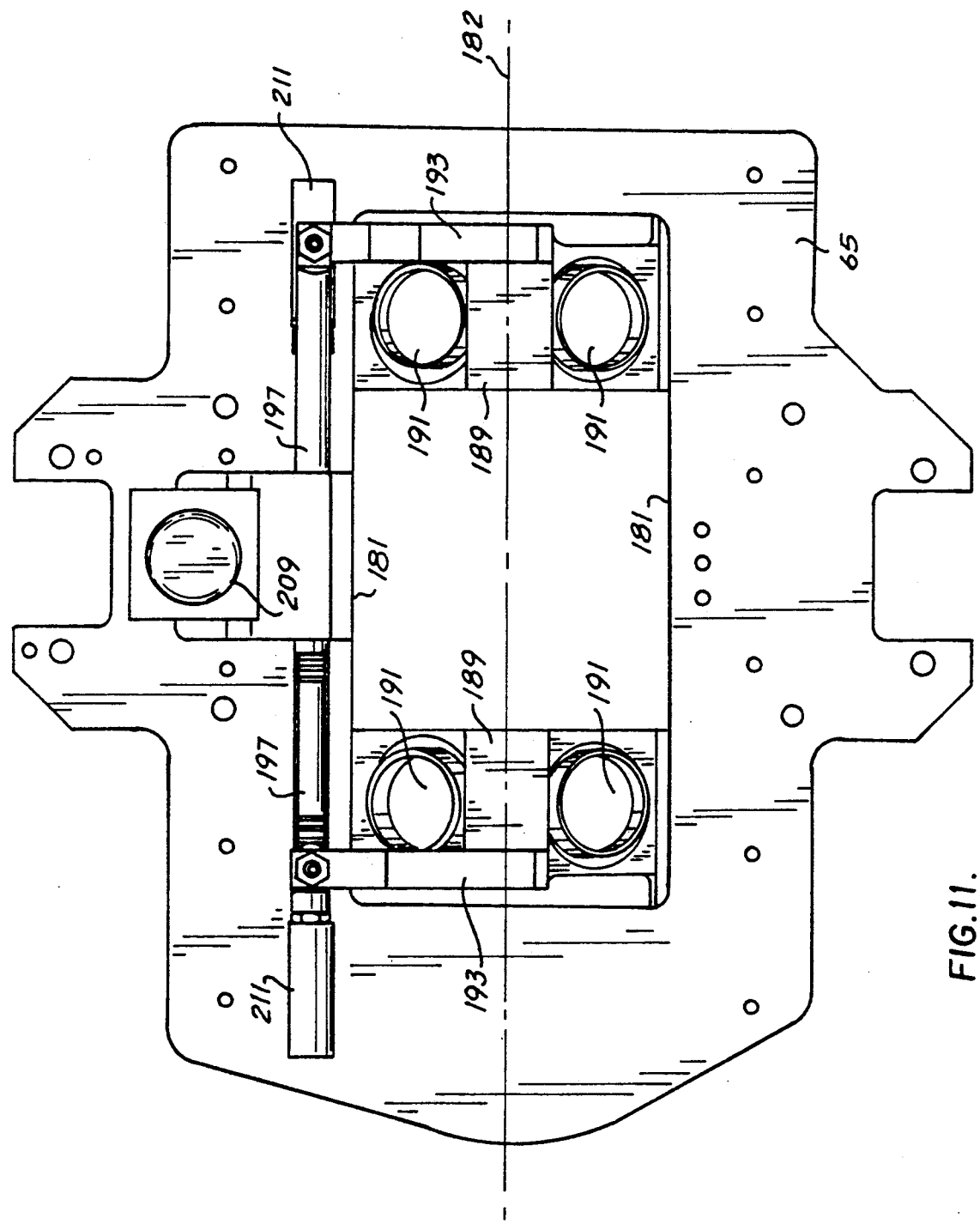
FIG. 11 is a top plan view of the drill and drill feed assembly illustrated in FIGS. 9 and 10.
Figure 12:
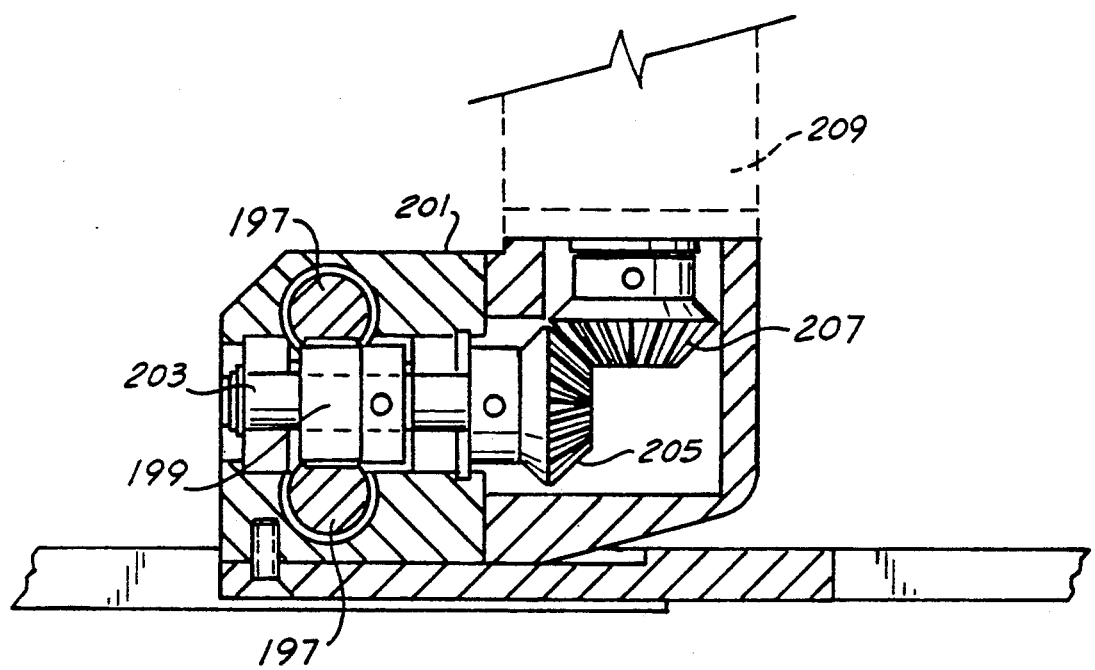
FIG. 12 is a cross-sectional view of a portion of the drill feed assembly illustrated in FIGS. 9-11.
Figure 13:
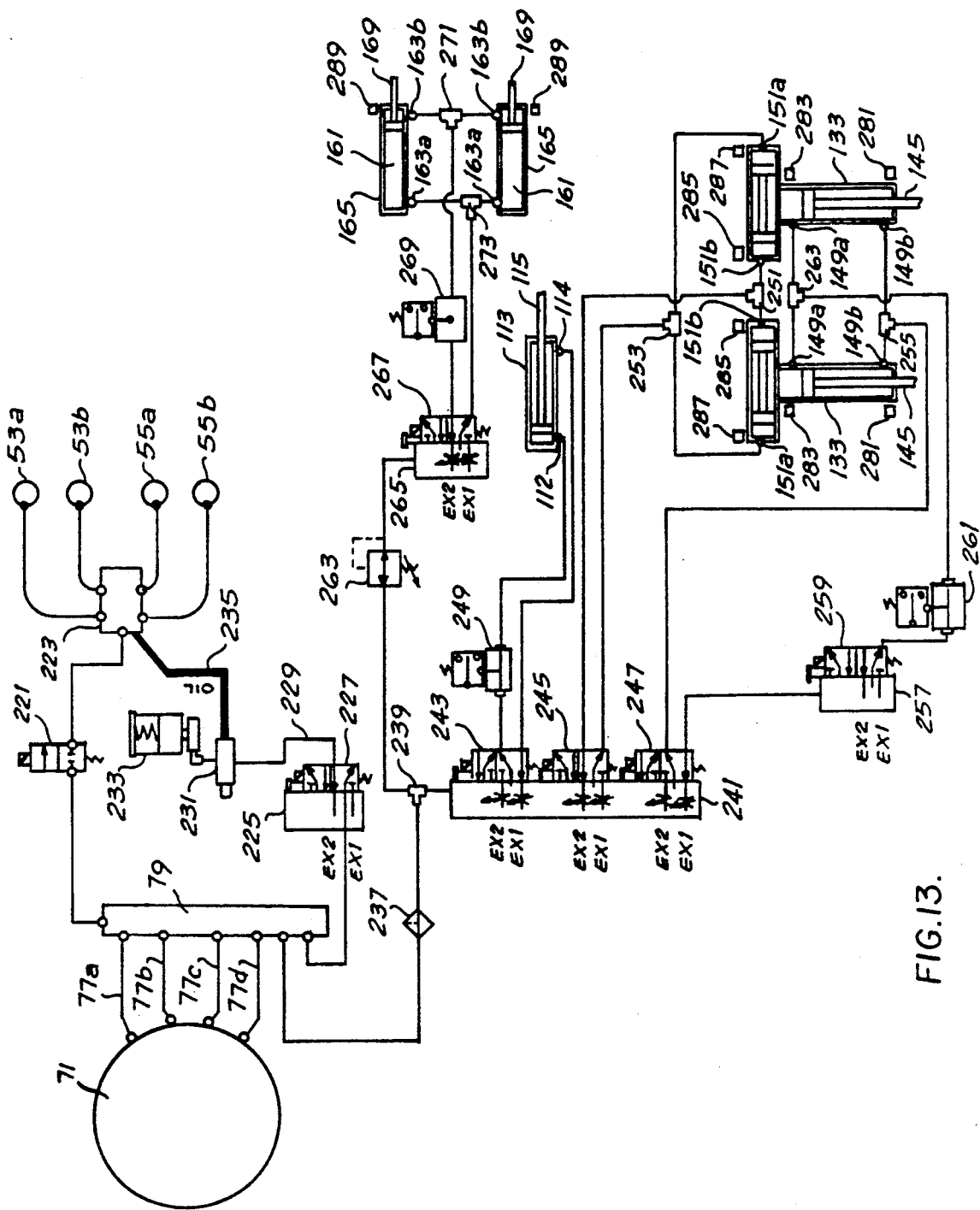
FIG. 13 is a pneumatic schematic diagram of the stringer clip end effector mechanism illustrated in FIGS. 3-6.
Figure 14:
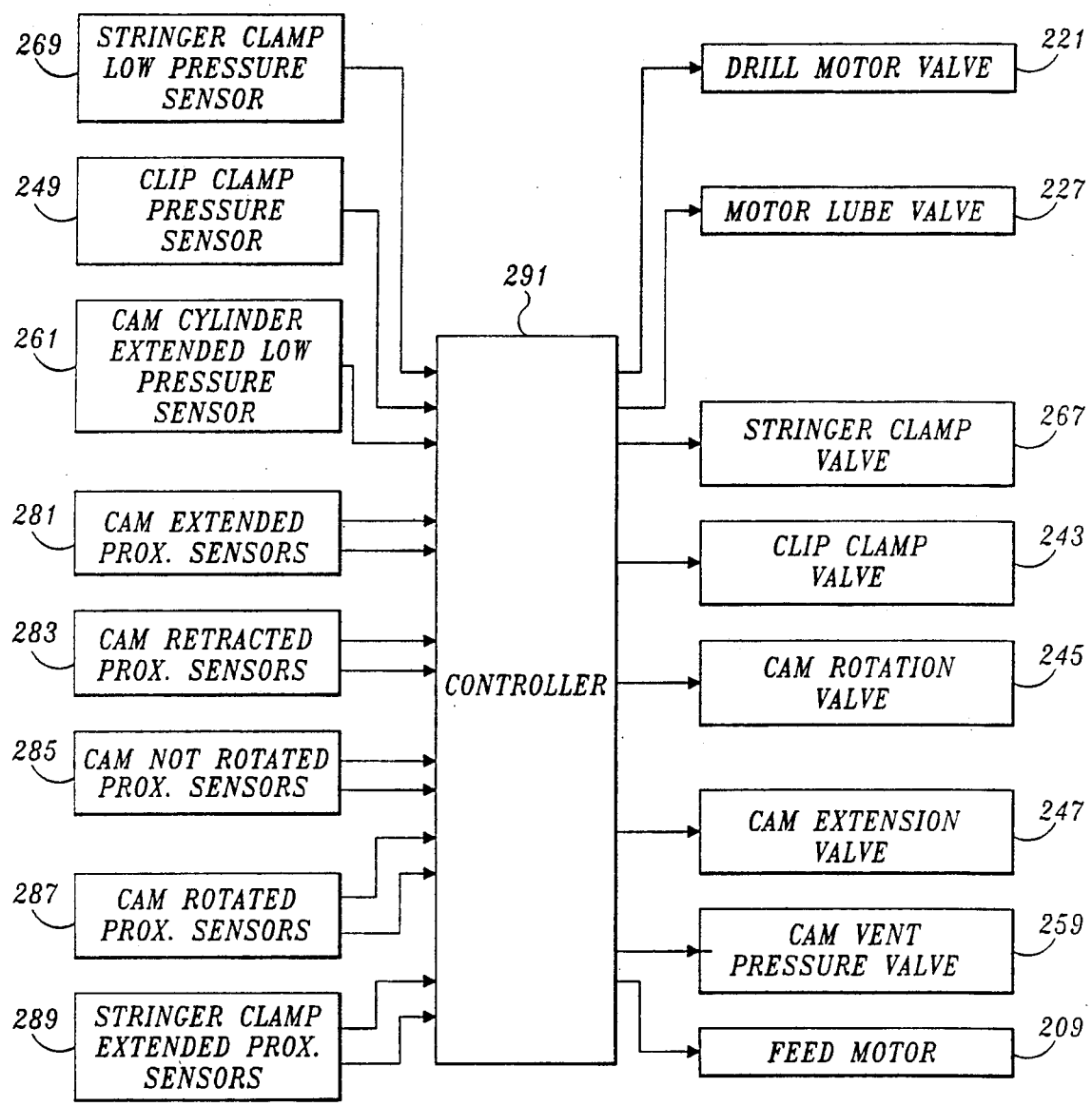
FIG. 14 is an electrical block diagram of the control system that controls the operation of the stringer clip end effective mechanism illustrated in FIGS. 3-6.

A preferred embodiment of a stringer clip end effector mechanism suitable for controlling the operation of the jaws 45 and 47, the sets of clamp elements 49a and 49b and 51a and 51b, and the drills 53a, 53b, 55a, and 55b, as well as the cams 60a and 60b, is illustrated in FIGS. 3-12 and described next. FIG. 13 is a pneumatic circuit diagram for the various mechanisms illustrated in FIGS. 3-12. FIG. 14 is an electrical block diagram of a control system suitable for controlling the operation of the stringer clip end effector mechanism illustrated in FIGS. 3-14. FIGS. 15-20 are flow diagrams illustrating the operation of the control system illustrated in FIG. 14 and, thus, the mechanical and pneumatic mechanisms illustrated in FIGS. 3-13.

The stringer clip end effector mechanism illustrated in FIGS. 3-12 includes a frame formed by four posts 61a, 61b, 61c, and 61d; upper and lower plates 63 and 65; a pair of upper brackets 67a and 67b; and a pair of lower brackets 69a and 69b. While various assembly mechanisms can be utilized, preferably, the upper and lower brackets 67a and 67b and 69a and 69b attach the columns 61a, 61b, 61c, and 61d together in pairs such that the columns are spaced apart. The spaced-apart pairs of columns are attached to the upper and lower plates 63 and 65 by bolts, for example. The assembly is such that the spaced-apart columns are also spaced apart. As a result, a relatively large area is created between the columns 61a, 61b, 61c, and 61d, and the upper and lower plates 63 and 65.

Mounted atop the upper plate 63 is a robotic quick change adaptor 71. The quick change adaptor 71 is configured to allow the stringer clip end effector to be attached to the end of the operating arm of a suitable computer-controlled (CC) machine tool, such as the JOMACH 16 produced by J.O.B.S., 29110 Piacenza, Italy. As will be readily understood by those familiar with the JOMACH 16 and similar computer-controlled machine tools, such machine tools include an arm whose position is controlled by computer-generated control signals. The arm includes electrical and pneumatic connectors that provide pneumatic and electrical power and electrical control signals for elements, such as end effectors mounted on the end of the position controllable arm. Electrical connections are made via a connector block 73. Pneumatic connectors are depicted pictorially in FIG. 6 by a series of circles 73 and 75a, 75b, 75c, and 75d. The pneumatic connectors 75a, 75b, 75c, and 75d are connected by hoses 77a, 77b, 77c, and 77d to a master manifold 79 mounted beneath the upper plate 63. As best shown in FIG. 13, the master manifold supplies pneumatic power to the various pneumatic actuators described below.

Figure 3:
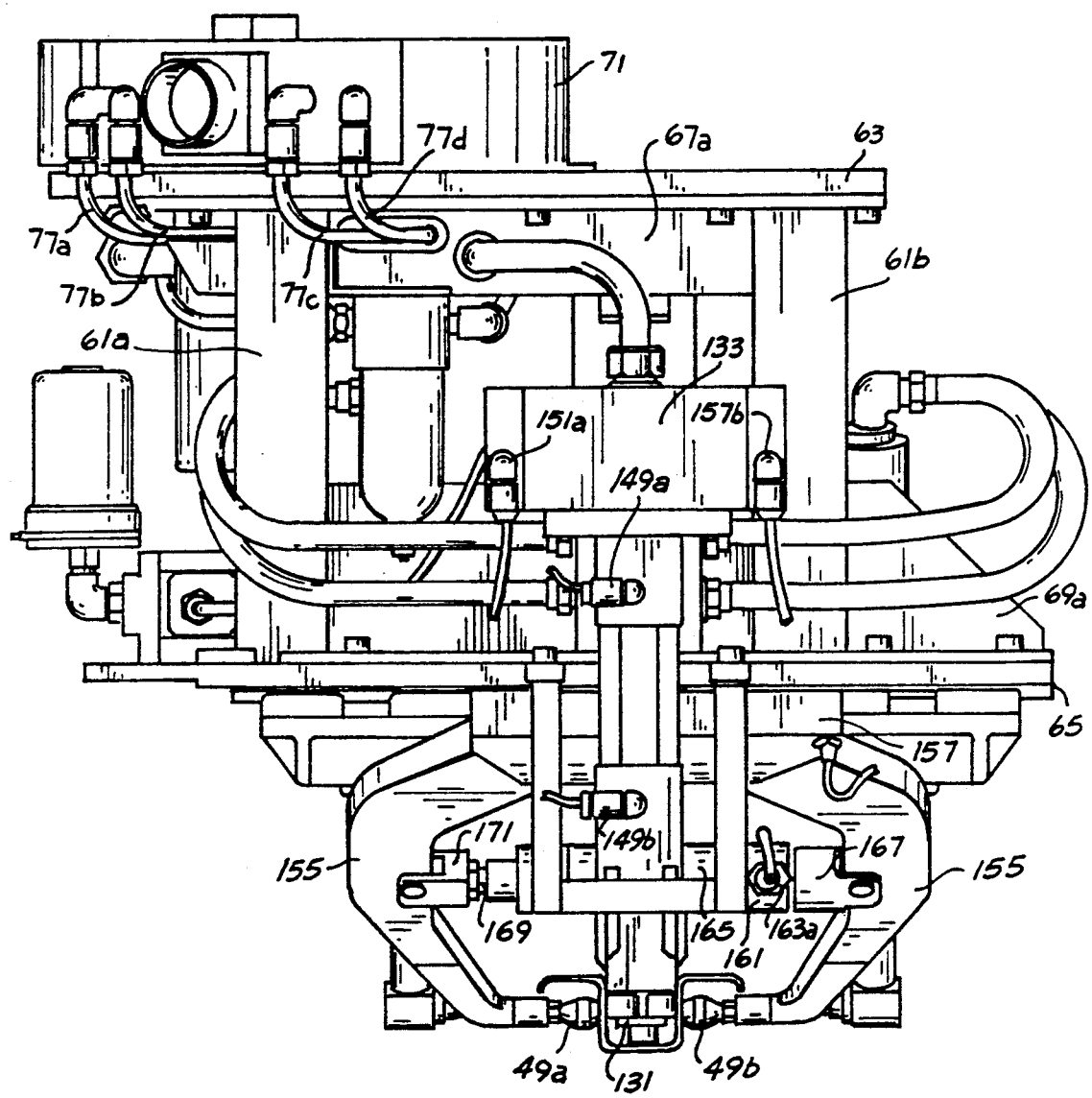
FIG. 3 is a front elevational view of a preferred embodiment of a stringer clip end effector mechanism formed in accordance with the invention.
Figure 4:
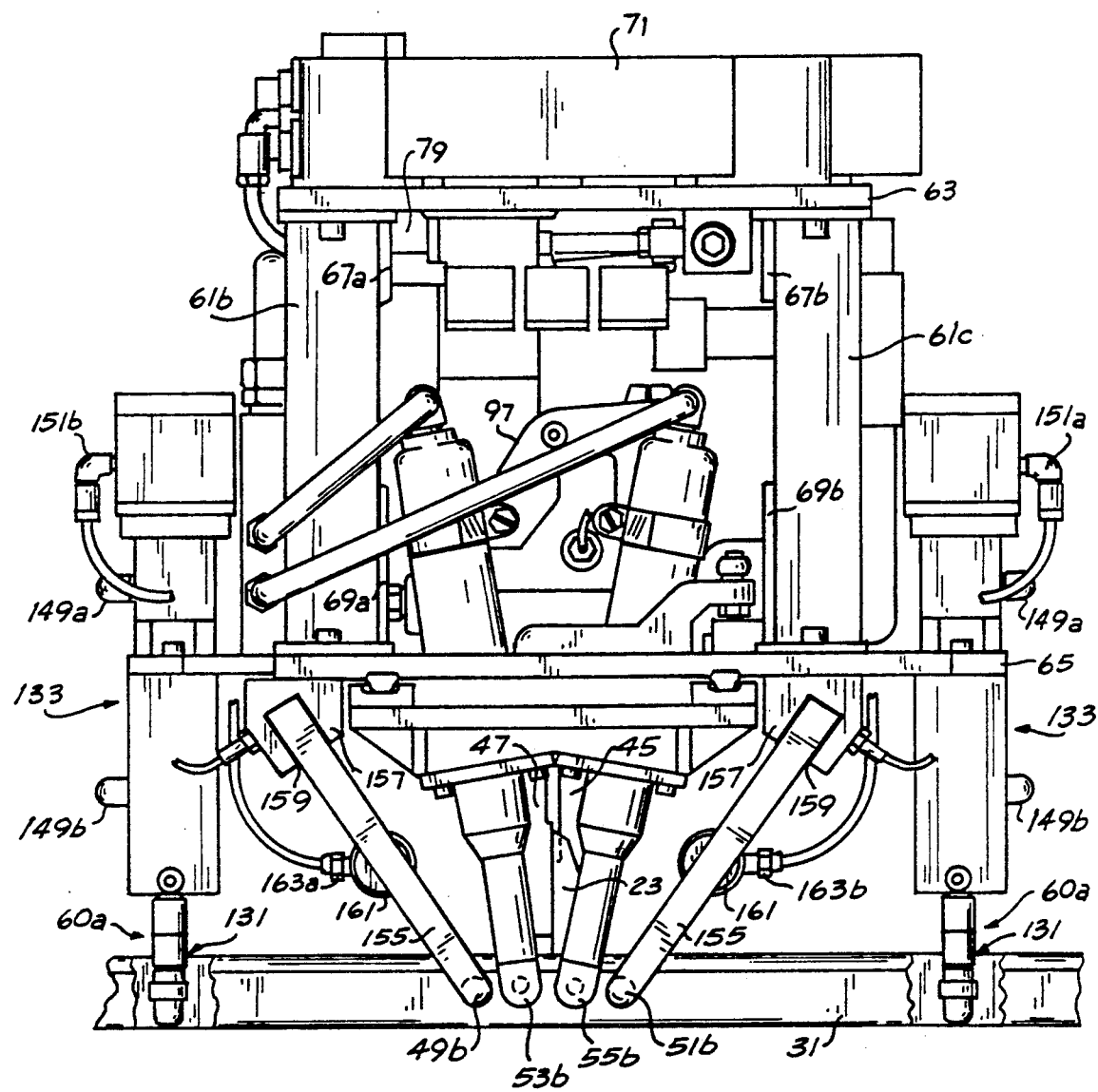
FIG. 4 is an elevational view of one side of the stringer clip end effector mechanism illustrated in FIG. 3.
Figure 5:
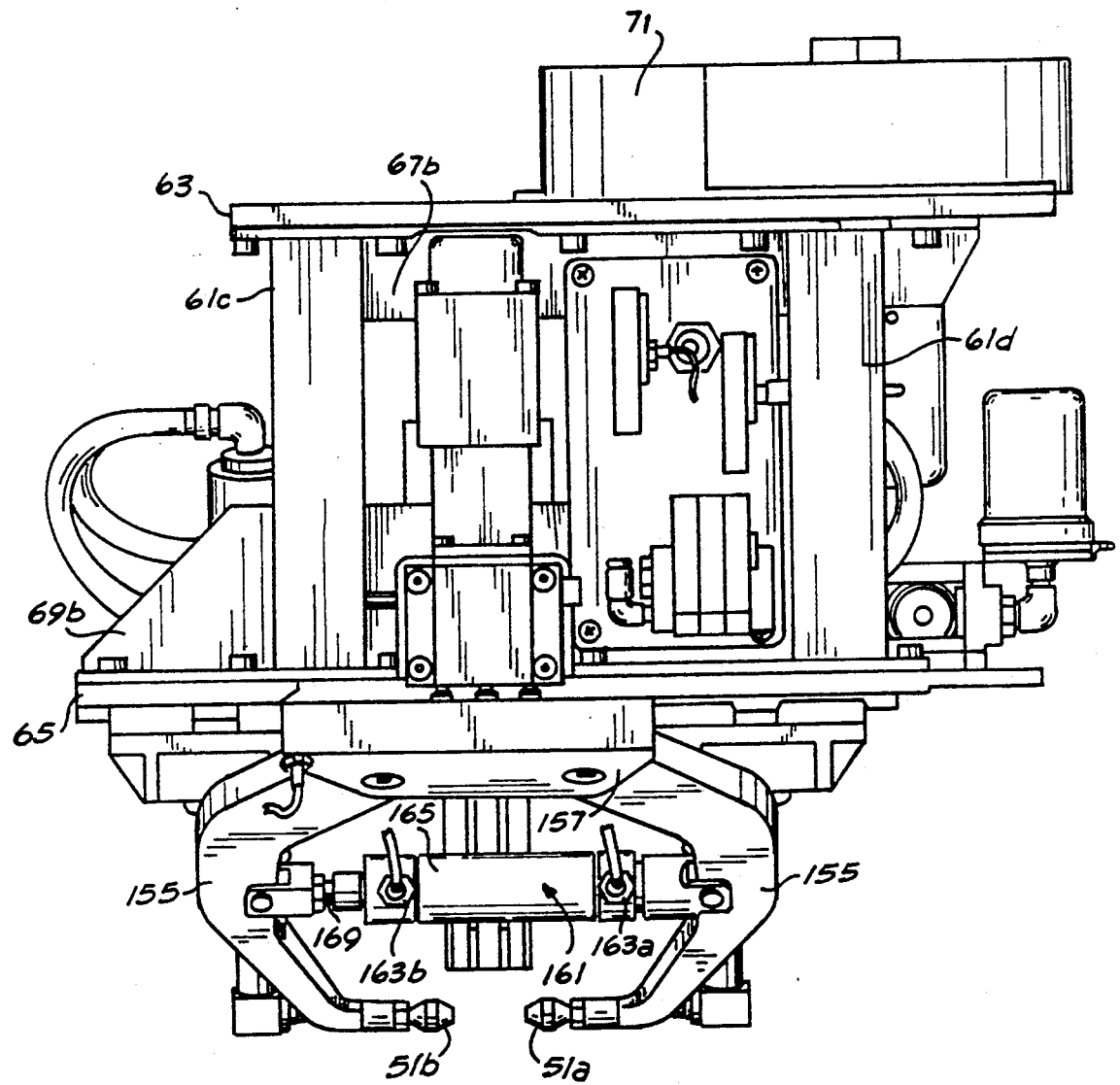
FIG. 5 is an elevational view of the other end of the stringer clip end effector mechanism illustrated in FIG. 4.
Figure 6:
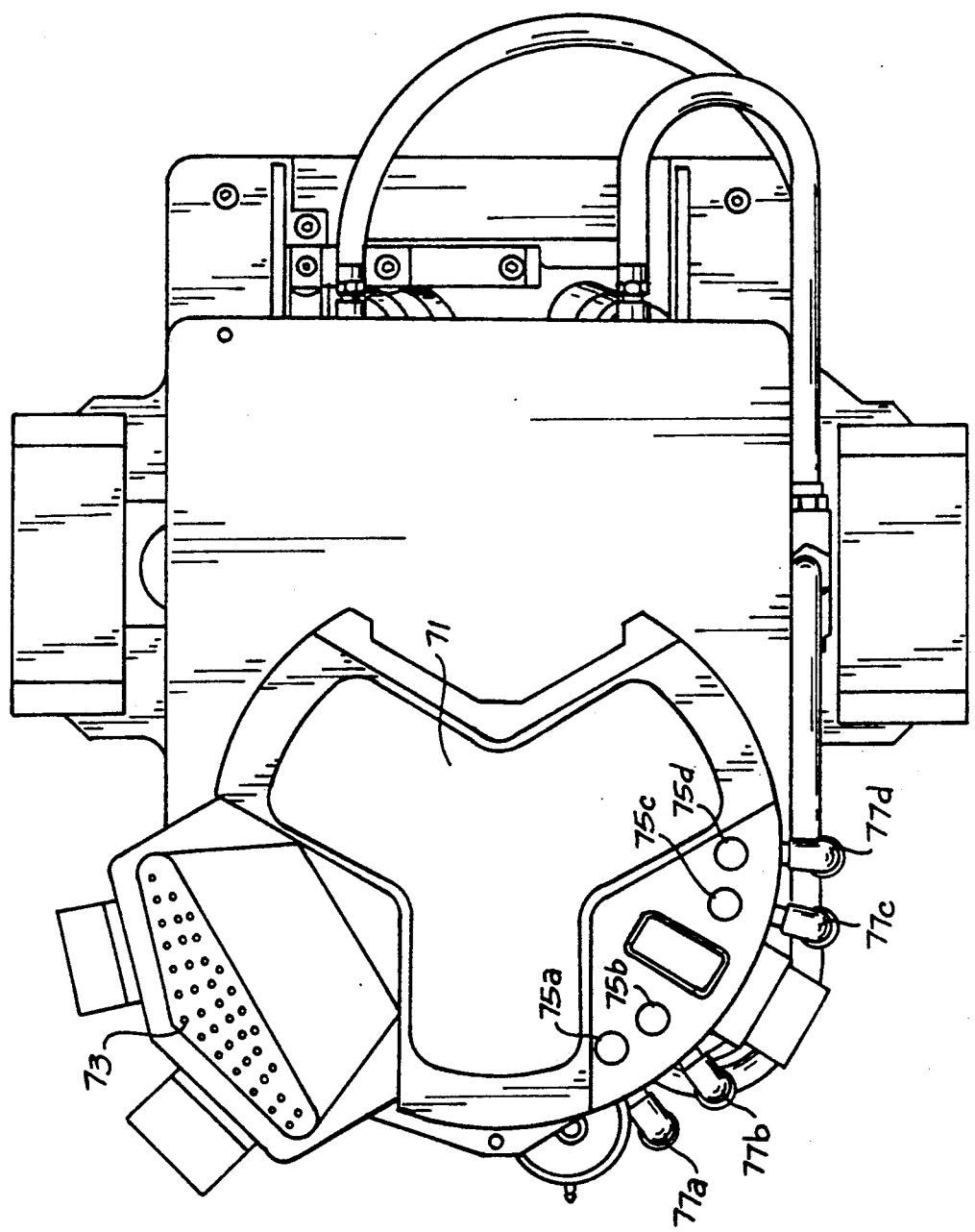
FIG. 6 is a top plan view of the stringer clip end effector mechanism illustrated in FIGS. 3-5.
Figure 7:
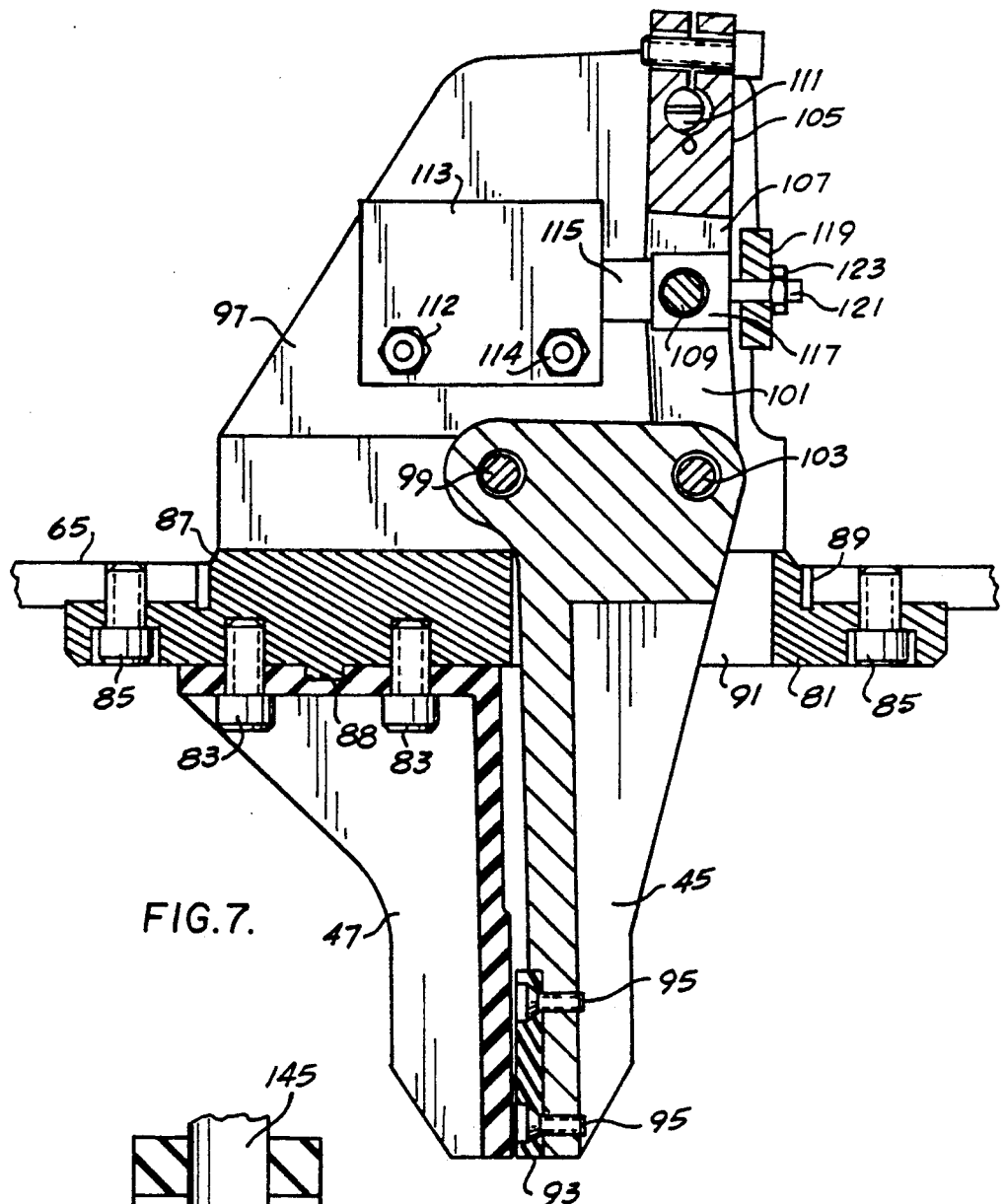
FIG. 7 is an elevational view, partially in section, of the jaw assembly of the stringer clip end effector mechanism illustrated in FIGS. 3-6.

The mechanism for actuating the jaws 45 and 47 that grip the clip 23 is mounted on the lower plate 65 in the approximate center thereof; as a result, it is difficult to see in FIGS. 3-5. The jaw actuating mechanism is best illustrated in FIG. 7. One of the jaws 47, which is formed of hardened tool steel, forms a reference tool face for positioning. More specifically, the positioning jaw is a fixed jaw that is attached to the lower plate 65 via a bracket 81. The fixed jaw 47 is pinned by a tang 88 formed in the bracket 81 and attached to the bracket 81 by cap screws 83. Other cap screws 85 attach the bracket 81 to the plate 65. The bracket is generally flat and includes an upwardly extending protrusion 87 that lies in a large central aperture 89 formed in the plate 65. Pins (not shown) mounted in the lower plate 65 are used to ensure that the bracket 81 is accurately aligned in the large central aperture 89.

The bracket 81 includes an aperture 91 through which the lower portion of the other jaw 45 passes. Whereas the first described jaw 47 is fixed, as will be better understood from the following description, the other jaw 45 is movable. Preferably, a layer of gripping material 93 is attached to the side of the movable jaw 45 that faces the fixed jaw 47, near the lower end thereof. The layer of gripping material 93 is attached to the movable jaw 45 by attachment screws 95. Preferably, the portion of the fixed jaw 47 lying above the layer of gripping material 93 is undercut.

The upper end of the movable jaw 45 lies between a pair of upwardly extending arms 97 that form part of the bracket 81. More specifically, the movable arm 45 is rotatably connected to the arms 97 via a pin 99 that extends between the arms and lies above, and in line with, the vertical plane in which the movable and fixed jaws 45 and 47 meet to grip a clip. The movable jaw 45 is also connected to one end of a first link 101 via a second pin 103. The first link extends generally upwardly. The second or link pin 103 is spaced from the jaw pin 99 along an axis that lies orthogonal to the gripping plane of the movable and fixed jaws 45 and 47. The link pin 103 is also located on the opposite side of the gripping plane from the fixed jaw 47.

The link 101 forms part of a toggle mechanism that also includes an inverted, U-shaped collar 105. The other end of the link 101 and one leg 107 of the U-shaped collar 105 are joined together via a pin 109. A second link (not viewable in FIG. 7) is connected to the other leg of the U-shaped collar 105 via the same pin 109. The cross member of the U-shaped collar 105 is pinned via a collar pin 111 to the upwardly extending legs 97 of the bracket 81.

A jaw pneumatic actuator 113 is mounted between the legs 97 of the bracket 81. The jaw pneumatic actuator 113 includes extension and retraction ports 112 and 114. The jaw pneumatic actuator also includes a shaft 115 whose outer end is connected via a block 117 to the pin 109 that joins the link 101 to the arms 107 of the U-shaped collar 105.

Extending between the legs 97 of the bracket 81 is a plate 119 through which a threaded pin 121 that extends outwardly from the block 117, in line with the shaft 115, passes. Mounted on the outer end of the threaded pin 121 is an adjustment nut 123. The jaw pneumatic actuator 113, and the toggle mechanism formed by the links 101, the collar 105, and the various pins, are oriented and positioned such that when the plunger 115 of the jaw pneumatic actuator 113 is moved inwardly, the movable jaw 45 is moved away from the fixed jaw 47. When the plunger 115 is extended, the movable jaw 45 is moved toward the fixed jaw 47 to create a grip pressure that grips a stringer clip positioned between the jaws in the manner illustrated in FIG. 1 and described above. Extension of the shaft 115 terminates when the block 117 impinges on the plate 119. At this point, the pins are in substantial alignment to create the greatest amount of pressure. Excessive pressure is absorbed by the layer of gripping material 93. Thus, the layer of gripping material has two functions. It increases jaw friction and absorbs compressive force. In essence, the jam closure mechanism allows a substantial amount of pressure to be applied to a stringer clip held between the jaws 45 and 47.

Figure 8:
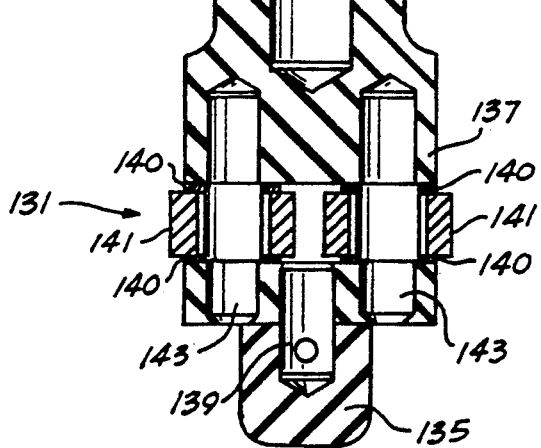
FIG. 8 is an elevational view, partially in section, of the tip of the cam roller assembly of the stringer clip end effector mechanism illustrated in FIGS. 3-6.

The roller cams 60a, 60b are best illustrated in FIGS. 3, 4, and 8. The cams are not illustrated in FIG. 5 in order to allow other mechanical mechanisms of the invention to be seen. Each cam 60a, 60b includes a head 131, best shown in FIG. 8, and a multimotion actuator 133 best illustrated in FIGS. 3 and 4. The head 131 includes a tip 135 attached to the lower end of a vertically oriented housing 137 by a pin 139. The tip 135 is formed of plastic and is generally cylindrical. The presently preferred plastic material is an ultra-high molecular weight (UHMW) polyethylene. The tip 135 has a diameter substantially less than the space between the walls 27 and 29 of a stringer 31.

The housing 137 includes an orthogonal cavity in which a pair of side-by-side oriented rollers 141 are rotatably mounted on shafts 143. Located between the rollers and the top and bottom of the cavity are washers 140. The rollers 141 are positioned on opposite sides of the pin 139 and extend outwardly from the cavity by a small amount. As a result of this arrangement, as best shown in FIG. 4, when viewed from one direction, the head 131 is relatively narrow. As best shown in FIGS. 3 and 8, when viewed from an orthogonal direction, the head is relatively wide. In the narrow direction the head width is substantially less than the space between the walls 27 and 29 of a stringer 31. In the wide direction, the head width is slightly greater than the width of a stringer clip 23, i.e., the distance between the outer surfaces of the walls 39 and 41 of a stringer clip.

The head 131 of each of the cams 60a, 60b is mounted on the shaft 145 of one of the multimotion actuators 133. The multimotion actuators 133 are formed and positioned so as to be able to raise and lower the shaft 145 and rotate the shaft 145 through an arc of 90 degrees. The raising and lowering of the shaft is controlled by pneumatic pressure applied to extension and retraction ports 149a and 149b; rotation of the shaft is controlled by pneumatic pressure applied to 0° and 90° ports 151a and 151b. The control system for controlling the application of pneumatic pressure to the various ports is illustrated in FIG. 13 and described below.

The sets of clamp elements 49a and 49b and 51a and 51b are each located on one end of a C-shaped arm 155. The other ends of the C-shaped arms 155 are rotatably mounted in brackets 157 attached to the bottom of the lower plate 65. More specifically, as best seen in FIGS. 3-5, two C-shaped arms 155 are mounted in each bracket 157. The brackets 157 are elongate and have a longitudinal axis that lies orthogonal to the longitudinal axis of the hat-shaped stringer 31. The brackets 157 include slots 159. One end of the C-shaped arms 155 are rotatably mounted in the slots 159. The slots are oriented such that their longitudinal axes lie orthogonal to the longitudinal axis of the stringer 31 and such that the plane defined by the pairs of arms 155 makes an angle of approximately 45 degrees with respect to the longitudinal axis of the hat-shaped stringer 31. Further, the pairs of arms angle toward one another. As a result, while the brackets 157 are spaced apart, the clamp element ends of the arms lie relatively near one another. As shown in FIGS. 1 and 4, the spacing between the clamp element ends of the arms is sufficient for the drills 53a, 53b, 55a and 55b to drill holes between the sets of clamp elements 49a and 49b and 51a and 51b.

Located between each pair of C-shaped arms 155 is a clamp pneumatic actuator 161. Pneumatic pressure is applied to the clamp pneumatic actuator 161 via extension and retraction ports 163a and 163b located at either end of the housing 165 of the actuators. One end of each of the housings 165 of the clamp pneumatic actuators 161 is attached to one of the C-shaped clamps 155 via a first yoke 167. The outer ends of the shafts 169 of the clamp pneumatic actuators 161 are attached to the other C-shaped clamp 155 mounted in the same slot 159 via a second yoke 171. In operation, when pneumatic pressure is applied to the retraction ports 163b of the clamp pneumatic actuators 161, the shafts 169 of the pneumatic actuators are withdrawn and clamp pressure is created. When pneumatic pressure is applied to the extension ports 163a, the shafts of the clamp pneumatic actuators are extended. When the shafts are extended, the clamp pressure is released. When the shafts are retracted, clamp pressure is applied to the outer surface of the walls 27 and 29 of the hat-shaped stringer 31. Because of the way C-shaped arms 155 are rotatably mounted in the brackets 157, the clamps are free-floating. Because the clamps are free-floating, they self-center themselves about the hat-shaped stringer 31. As a result, equal pressure is applied to the walls 27 and 29.

Figure 9:
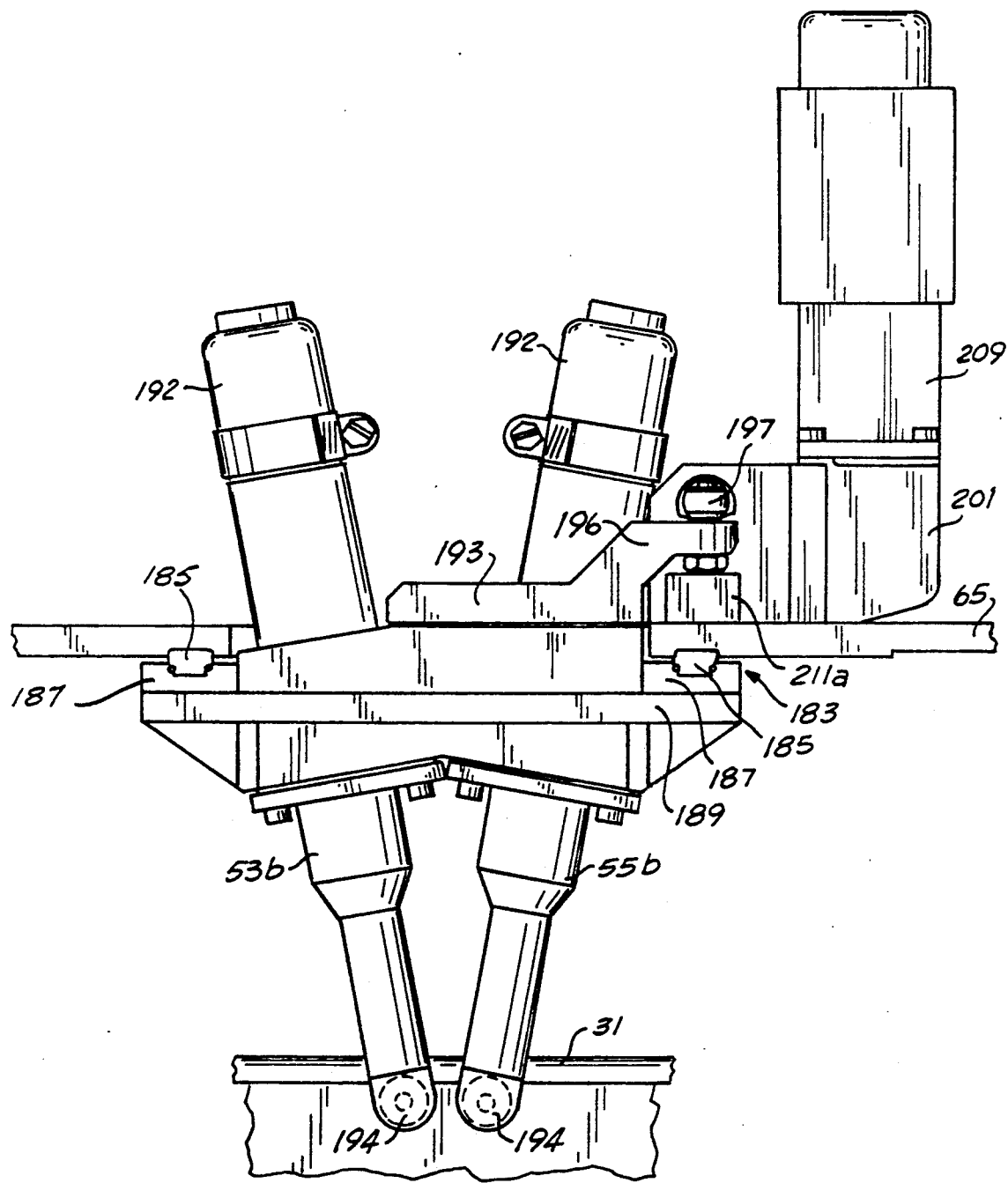
FIG. 9 is a side elevational view of the drills and the drill feed assembly of the stringer clip end effector mechanism illustrated in FIGS. 3-6.
Figure 10:
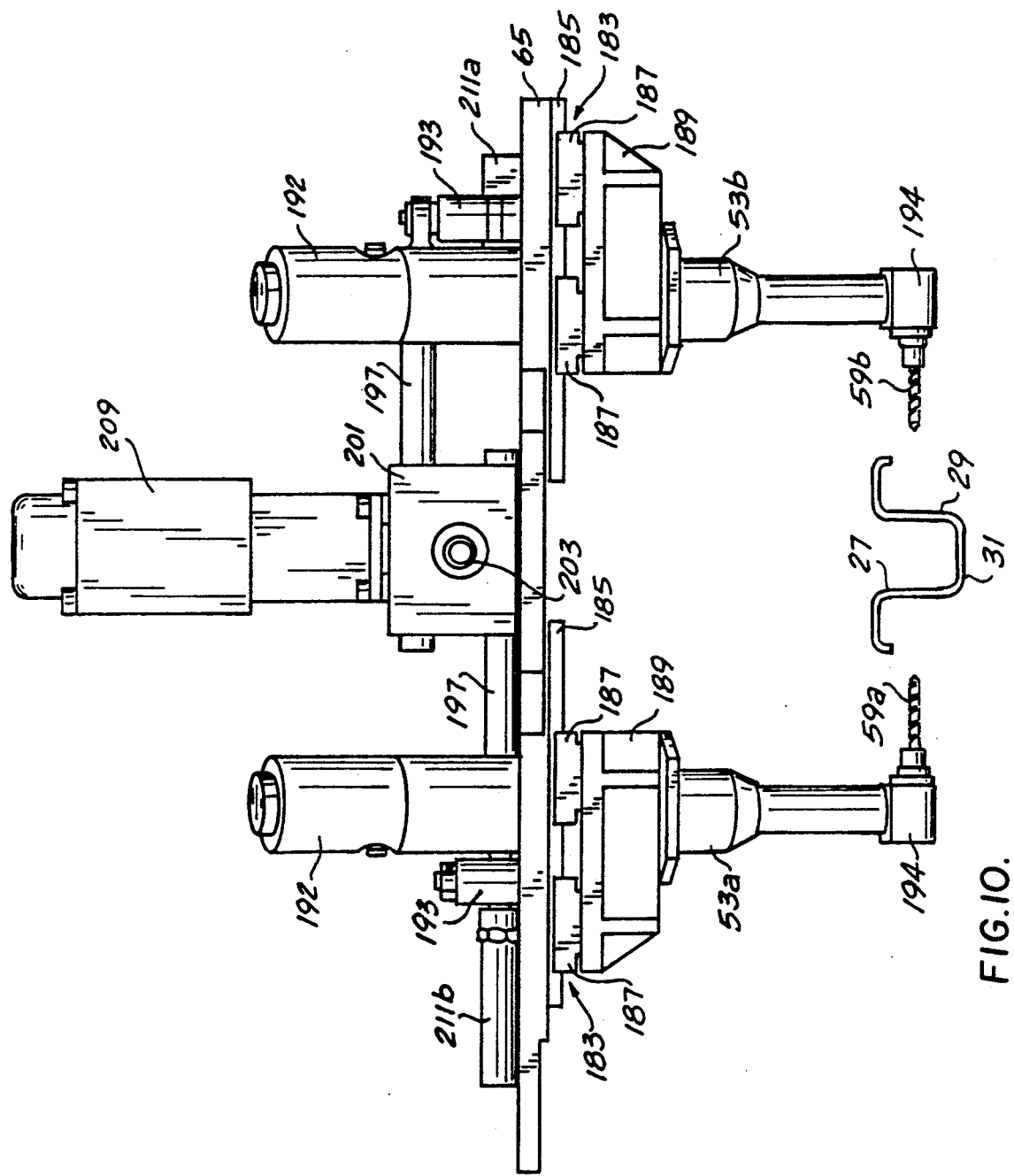
FIG. 10 is a front elevational view of the drill and drill feed assembly illustrated in FIG. 9.

The mechanism for moving the drills 53a, 53b, 55a and 55b inwardly and outwardly is illustrated in FIGS. 9, 10 and 11. Preferably, the drills are pneumatic drills. FIG. 11 illustrates the drill movement mechanism without the drills 53a, 53b, 55a and 55b and other mechanism mounted on the lower plate 65. As shown in FIG. 11, the lower plate 65 includes the large central aperture 89 in which the jaw bracket 81 (FIG. 7) is mounted. The large central aperture 89 is rectangular in shape and includes a longitudinal axis 182 that lies orthogonal to the longitudinal axis of the hat-shaped stringer 31. The jaw bracket lies orthogonal to the longitudinal axis 182.

As shown in FIGS. 9 and 10, located beneath the lower plate 65, are linear bearing slide mechanisms 183. Each of the linear bearing slide mechanisms includes a track 185, which is attached to the bottom of the lower plate 65. The tracks are located along the edges 181 of the large central aperture 89 that lie orthogonal to the longitudinal axis of the stringer 31. The linear bearing slide mechanisms also include a plurality of slides 187, which are attached to a pair of housings 189. The housings 189 are located on opposite sides of the large central aperture 181 and lie orthogonal to the tracks 185.

Each of the housings 189 includes a pair of angled cylindrical apertures 191 (FIG. 11) in which the motors 192 of the drills 53a, 53b, 55a and 55b are mounted. The cylindrical apertures are oriented such that the longitudinal axes of the drill motors mounted in the same bracket converge toward one another. The drills include right-angle drive units 194. The drills are oriented such that the drill bits 57a, 57b, 59a and 59b extend toward the walls 27 and 29 of the stringer 31. As a result of this structural arrangement, two pairs of drills lie on opposite sides of the hat-shaped stringer 31 and opposed drill bits face one another.

Attached to the upper surface of each of the brackets 189 is an arm 193. The arms include a projection 196 that overlies the upper surface of the lower plate 65, ending approximately above one of the linear bearing slide mechanisms 183. See FIG. 9. The outer ends of the projections 196 are each attached to the outer end of a rack 197 of a rack-and-pinion mechanism. More specifically, the rack-and-pinion mechanism includes the pair of racks 197 and a pinion 199. As shown in FIGS. 10 and 12, the racks 197 lie parallel to one another, one above and the other below the pinion 199. The pinion 199 is located in a housing 201 and affixed to a shaft 203. Located on one end of the shaft 203 is a first bevel gear 205. The first bevel gear 205 meshes with a second bevel gear 207. The second bevel gear 207 is mounted on the vertically oriented shaft of a drill feed servo motor 209.

In operation, when the drill feed motor 209 is energized, the interacting bevel gears cause rotation of the pinion 199. Rotation of the pinion causes the racks to extend or retract, depending upon the direction of pinion rotation. The direction of pinion rotation, in turn, is controlled by the direction of rotation of the shaft of the drill feed motor 209. In any event, as the racks 197 are moved back and forth, the arms 193 and, in turn, the brackets 189 are moved back and forth. As a result, the drills 51a, 51b, 53a and 53b are moved inwardly and outwardly with respect to the hat-shaped stringer 31. Inner and outer limit stops 211a and 211b located so as to be impinged on by the ends of the lower rack 197 control the minimum and maximum outward positions of the drill bits 57a, 57b, 59a and 59b. While not shown, the limit stops are, of course, adjustable.

FIG. 13 is a pneumatic diagram that illustrates how the various pneumatic mechanisms described above are connected together and operate. FIG. 13 also illustrates the locations of a plurality of pressure and proximity sensors, whose information is used by the hereinafter-described control system.

As shown in FIG. 13, one output of the master manifold 79 is connected through a drill motor valve 221 to a drill motor manifold 223. The drill motor manifold, in turn, is connected to the pneumatic drill motors 53a, 53b, 55a and 55b. The drill motor valve 221 is spring loaded so as to be open when unenergized. When the drill motor valve 221 is energized, pneumatic pressure from the master manifold 79 is applied to the drill motor manifold 223.

A second output of the housing manifold 79 is connected to the manifold 225 of a motor lube valve 227. The motor lube valve 227 is a two-position valve. A line 229 connects the single port of the motor lube valve 227 to an injection oiler 231. When the motor lube valve is deenergized, the injection oiler is connected to an exhaust outlet (EX2) of the motor lube valve manifold 225. When the motor lube valve 227 is energized, pneumatic pressure from the manifold 79 is applied to the injection oiler 231 via the line 229. Oil is supplied to the injection oiler 231 by an oil reservoir 233. The oil output of the injection oiler 231 is connected via an oil line 235 to the drill motor manifold 223.

A third output of the pneumatic manifold 79 is connected through a minature air filter 237 to a first tee 239. One output of the first tee 239 is connected to the input of a multiple-valve manifold 241. The multiple-valve manifold supplies pressure and exhaust outlets to a clip clamp valve 243, a cam rotation valve 245 and a cam extension valve 247. The clip clamp, cam rotation and cam extension valves are all two-position valves, each of which includes two ports-an upper port and a lower port.

When deenergized, the clip clamp valve 243 applies pressure via a clip clamp pressure sensor 249 to the extension port 112 of the jaw pneumatic actuator 113 (FIG. 7). When deenergized, the clip clamp valve 243 also connects an exhaust outlet (EX1) to the retraction port 114 of the jaw pneumatic actuator 113. When the clip clamp valve 243 is energized, these connections are reversed. More specifically, pressure is applied by the clip clamp valve 243 to the retraction port 114 of the jaw pneumatic actuator 113, and the extension port 112 is connected to an exhaust outlet (EX2).

The upper port of the cam rotation valve 245 is connected to a second tee 251, and the lower port of the cam rotation valve 245 is connected to a third tee 253. The other two orifices of the second tee 251 are connected to the 90° ports 151b of the multimotion actuators 133, i.e., the ports of the multimotion actuators 133 to rotate their shafts 145 to a position whereat the wide portion of the heads 131 of the stringer spreader mechanisms 60a and 60b lie orthogonal to the walls of the hat-shaped stringer 31. The other two orifices of the third tee 253 are connected to the 0° ports 151a of the multimotion actuators 133, i.e., the ports of the multimotion actuators that cause the shafts 145 of the multimotion actuators to rotate the heads 131 to a position whereat the wide portion of the head lies parallel to the walls of the hat-shaped stringer 31.

When deenergized, the upper port of the cam rotation valve 245 is connected to an exhaust outlet (EX2). As a result, ports 151b are free to discharge pressure. Simultaneously, pressure is applied via the lower port of the cam rotation valve and, thence, to the 0° ports 151a of the multimotion actuators 133. As a result, the shafts 145 of the multimotion actuators 133 are rotated to a position whereat the wide section of the heads 131 lie parallel to the walls of the hat-shaped stringer 31. When the cam rotation valve 245 is energized, this is reversed. More specifically, pressure is applied via the 90° ports 151b to the multimotion actuators 133. As a result, the shafts 145 of the actuators rotate the heads 131 of the multimotion actuators to a position whereat the thick portion of the heads lie orthogonal to the walls of the hat-shaped stringer. Simultaneously, 0° ports 151a of the multimotion actuators 133 are connected to an exhaust outlet (EX1), which allows pressure to be discharged from the other side of the actuators.

The upper port of the cam extension valve 247 is connected to one port of a fourth tee 255. The other orifices of the fourth tee 255 are connected to the retraction ports 149b of the multimotion actuators 133. The lower port of the cam extension valve 247 is connected to the manifold 257 of a cam vent pressure valve 259. The cam vent pressure valve 259 has a single port that is connected via a cam cylinder extended low-pressure sensor 261 to of a fifth tee 263. The other orifices of the fifth tee 263 are connected to the extension ports 149a of the multimotion actuators 133.

When the cam extension valve 247 is unenergized, pneumatic pressure is applied to the retraction ports 149b of the multimotion actuators 133 via the upper port of the cam extension valve 147. As a result, the shafts 145 of the multimotion actuators 133 are retracted. Simultaneously, the extension ports 149a are free to exhaust pressure via the unenergized cam pressure control valve and the lower port of the cam extension valve 247, which is connected to an exhaust outlet (EX1) of the multiple-valve manifold 241.

When the cam extension valve 247 is energized, the retraction ports 149b of the multimotion actuators 133 are free to exhaust pressure via the upper port of the cam extension valve 247, which is connected to an exhaust outlet (EX2) of the multiple-valve manifold 241. At the same time, pressure is applied to the cam pressure control valve 259. If unenergized, the cam vent pressure valve 259 forms a pass-through, whereby pressure is applied to the extension ports 149a of the multimotion actuators. As a result, the shafts 145 of the multimotion actuators 133 are extended.

When both the cam vent pressure valve 259 and the cam extension valve 247 are energized, pressure is not applied to either the extension or the retraction ports 149a and 149b of the multimotion actuators 133. Rather, both ports are free to discharge pressure. Both ports are free to discharge pressure because the extension ports 149a are connected to an exhaust outlet (EX1) of the manifold 257 of the cam vent pressure valve 259 and the retraction ports 149b are connected to an exhaust outlet (EX2) of the cam extension valve 247. As a result, the shafts 145 of the multimotion actuators are free to float.

The third port of the first tee 239 is connected through a pressure regulator 263 to the manifold 265 of a stringer clamp valve 267. The stringer clamp valve 267 has upper and lower ports. The upper port of the stringer clamp valve 267 is connected through a stringer clamp low-pressure sensor 269 to a sixth tee 271. The other orifices of the sixth tee 271 are connected to the retraction ports 163b of the stringer clamp pneumatic actuators 161. The lower port of the stringer clamp valve 267 is connected to a seventh tee 273. The other orfices of the seventh tee 273 are connected to the extension ports 163a of the stringer clamp pneumatic actuators 161. When unenergized, the stringer clamp valve 267 connects its upper port to an exhaust port (EX2) of the manifold 265. The lower port is connected to apply pneumatic pressure to the extension ports 163a of the stringer clamp pneumatic actuators 161. As a result, the shafts 169 of the stringer clamp pneumatic actuators are extended. As noted above, when the shafts of the stringer clamp pneumatic actuators are extended, the clamps are opened. When the stringer clamp valve 267 is energized, pressure is applied through the stringer clamp pressure sensor 269 to the stringer clamp retraction ports 163b, causing the shafts 169 to be retracted. At the same time, the stringer clamp extension ports 163a are connected to an exhaust port (EX1) of the manifold 265. This causes the arms of the clamps to be moved toward one another whereby clamping pressure is applied to the sidewalls 27 and 29 of the hat-shaped stringer 31.

In addition to the clip clamp pressure sensor 249, the cam cylinder extended low-pressure sensor 261 and the stringer clamp low-pressure sensor 269, a plurality of proximity sensors are positioned so as to sense the position of the pistons and, thus, the extension retraction state of the shafts of the various pneumatic actuators. The proximity sensors include cam extended proximity sensors 281, cam retracted proximity sensors 283, cam not-rotated proximity sensors 285, cam rotated proximity sensors 287, and stringer clamp extension proximity sensors 289.

FIG. 14 illustrates a control system suitable for controlling the various valves illustrated in FIG. 13 in accordance with a control program and information received from the various pneumatic and proximity sensors illustrated in FIG. 13. FIGS. 15–20 illustrate a program suitable for use by the controller 291 that forms a part of the illustrated control system. More specifically, the controller 291 receives electrical signals from the stringer clamp low-pressure sensor 269, the clip clamp pressure sensor 249 and the cam cylinder extended low-pressure sensor 261. The controller 291 also receives electrical signals from the cam extended proximity sensors 281, the cam retracted proximity sensors 283, the cam not-rotated proximity sensors 285, the cam rotated proximity sensors 287 and the stringer clamp extended proximity sensors 289. The binary state of the electrical signals denotes the information detected by the various pneumatic and proximity sensors, i.e., whether pressure in the related line is high or low, or whether the piston of the actuator is near or far from the sensor. Based on the binary state of the electrical signals produced (or controlled) by the pneumatic and proximity sensors and a suitable program, the controller 291 produces control signals that control the operation of the drill motor valve 221, the motor lube valve 227, the stringer clamp valve 267, the clip clamp valve 243, the cam rotation valve 245, the cam extension valve 247, and the cam vent pressure valve 259. The controller also produces electrical signals that control the operation of the drill feed motor 209. The controller includes suitable interfaces, a central processing unit (CPU), suitable permanent memory, such as a read-only memory, suitable volatile memory, such as a random access memory, and other conventional integrated circuit chips well known to those in the microprocessor arts.

Figure 15:
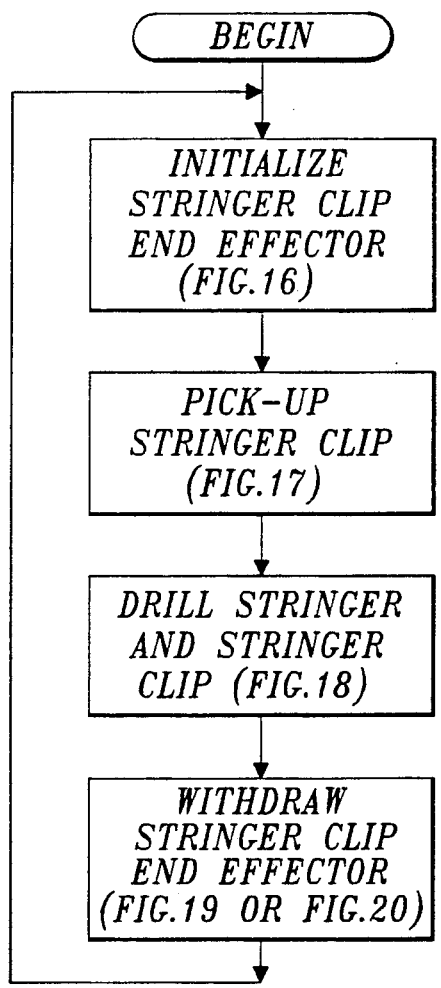
FIG. 15 is a block diagram of a program suitable for controlling the control system illustrated in FIG. 14.
Figure 16:
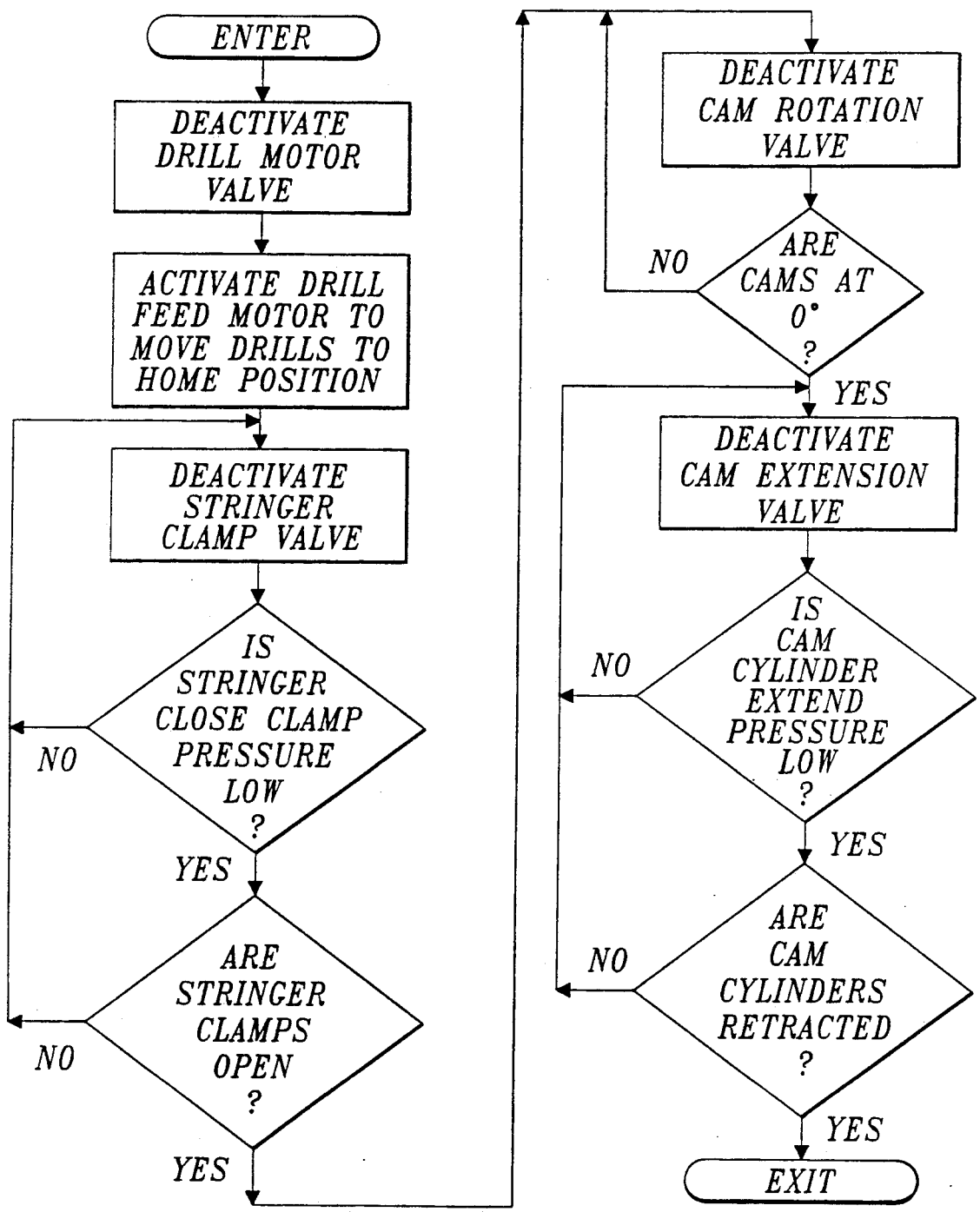
FIG. 16 is a flow diagram illustrating in detail the initialized stringer clip end effector portion of the program illustrated in FIG. 15.
Figure 17:
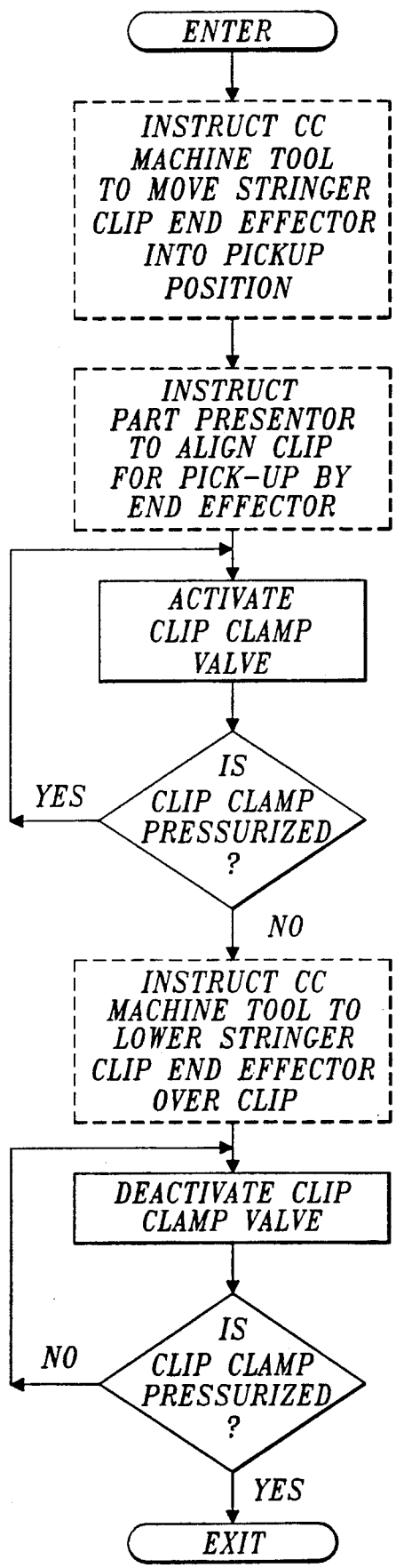
FIG. 17 is a flow diagram of the pick-up stringer clip portion of the program illustrated in FIG. 15.
Figure 18:
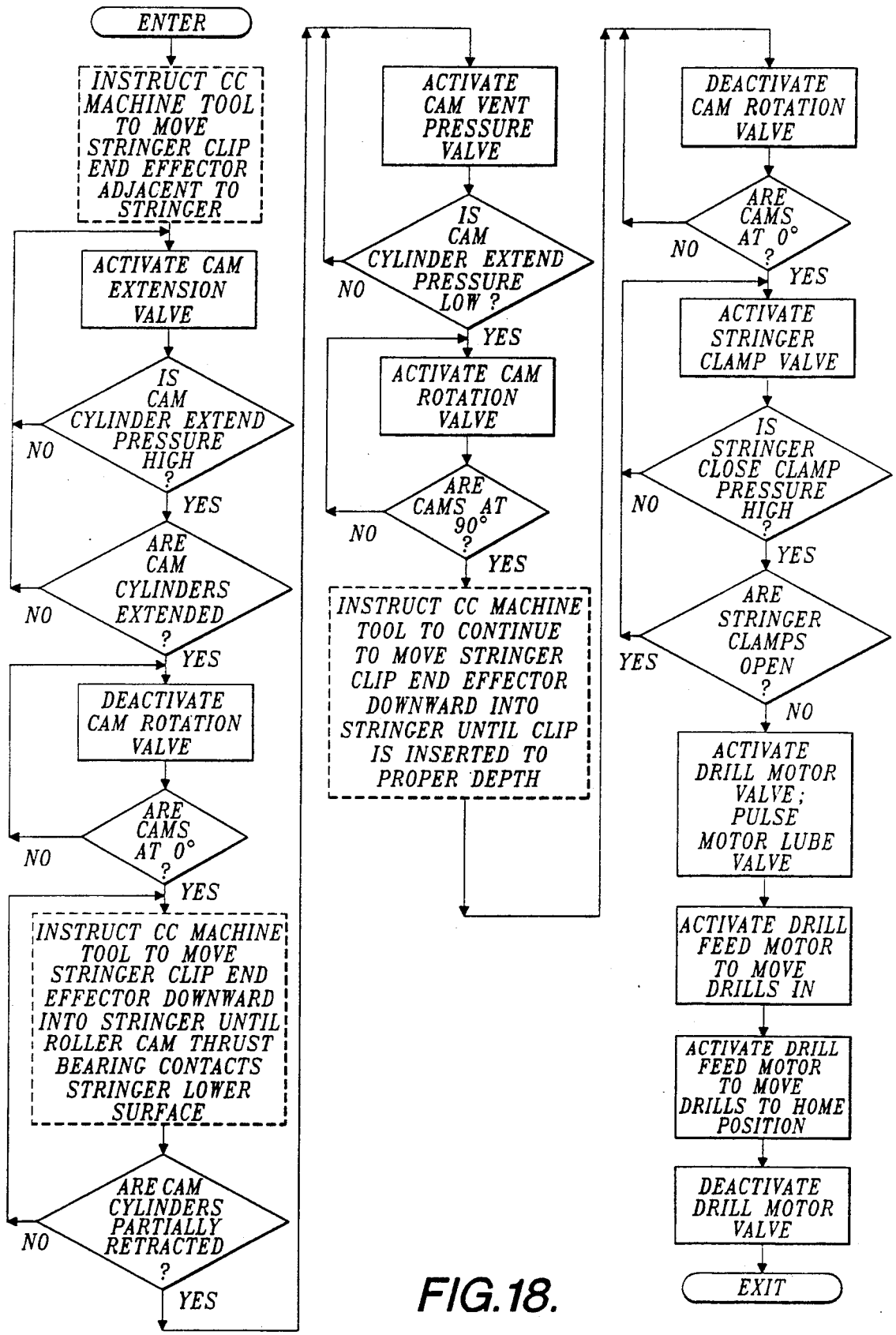
FIG. 18 is a flow diagram of the drill stringer clip portion of the program illustrated in FIG. 15.

As illustrated in FIG. 15, the program that operates the controller includes four major subroutines. The first subroutine, executed after start-up, is an initialization subroutine that initializes the stringer clip and effector. This subroutine is illustrated in FIG. 16 and described below. After the stringer clip and effector has been initialized, a pass is made through a pick-up stringer clip subroutine, which is illustrated in FIG. 17 and described below. After the pass through the pick-up stringer clip subroutine is complete, a pass is made through a drill stringer and stringer clip subroutine. This subroutine is illustrated in FIG. 18 and described below. After the pass through the drill stringer and stringer clip subroutine, a pass is made through a withdraw end effector subroutine. Two different withdraw end effector subroutines are illustrated in FIGS. 19 and 20, respectively. Both subroutines are described below. After a pass is made through the selected withdraw end effector subroutine, the entire sequence is repeated, starting with a pass through the initialize stringer clip end effector subroutine (FIG. 16).

The first step in the initialize stringer clip end effector subroutine (FIG. 16) is to deactivate the drill motor valve 221. As a result, the drill motors 53a, 53b, 55a and 55b are deenergized, if they were previously energized. At this time, the motor lube valve 227 is deactivated. As a result, the oil injector 231 is deenergized, whereby oil cannot be supplied to the drill motor manifold 223. Next, the drill feed motor 209, which controls the operation of the heretofore-described rack-and-pinion mechanism, is activated to move the drills 53a, 53b, 55a and 55b to their outermost, or home position. This position is illustrated in FIG. 10.

Next, the stringer clamp valve 267 is deactivated, i.e., deenergized, if previously energized. As a result, as described above, pressure is applied to the extension ports 163a of the clamp pneumatic actuators 161, causing the shafts 169 of the actuators to extend and clamp pressure to be released. Next, a test is made to determine if stringer close clamp pressure is low. This is accomplished by testing the signal produced by the stringer clamp low-pressure sensor 269. If stringer close clamp pressure is not low, the command to deactivate the stringer clamp valve 267 is repeated. If the stringer close clamp pressure is low, a test is made to determine if the stringer clamps are open. This is accomplished by testing the signals produced (or controlled) by the stringer clamp extended proximity sensors 289. For ease of illustration, the stringer clamp extended proximity sensors are shown in FIG. 13 as positioned at one end of the housings 165 of the clamp pneumatic actuators 161. In actuality, the clamp extended proximity sensors are positioned to sense when one of the C-shaped clamp arms 155 of each of the pairs of associated arms is in a clamped position. This may be accomplished by the coaction between a tab on the jaw and a stringer clamp extended proximity sensor 289. If the stringer clamp extended proximity sensors are detecting the jaw tab, the cycle is repeated, starting with the command to deactivate the stringer clamp valve.

If the stringer clamp extended proximity sensors 289 are not detecting the jaw tab, which means that stringer clamps are open, the cam rotation valve 245 is deactivated, i.e., deenergized, if previously energized. Then, a test is made to determine if the roller cams are at 0 degrees, i.e., if the wide portion of the roller cams lie parallel with the longitudinal axis of a suitable positioned hat-shaped stringer when the cams are inserted in the stringer. This is accomplished by testing the state of the electrical signals produced or controlled by the cam rotated proximity sensors 287. (The cam rotated proximity sensors are positional modules mounted atop the related actuators and driven by the rotary motion of the shafts of the actuators.) If the cams are not at 0 degrees, the command to deactivate the cam rotation valve is repeated. If the cams are at 0 degrees, the cam extension valve 247 is deactivated, i.e., deenergized if previously energized.

Next, a test is made to determine if cam cylinder extend pressure is low. This is accomplished by testing the state of the electrical signal produced or controlled by the cam cylinder extended low-pressure sensor 261. If cam cylinder extend pressure is not low, the command to deactivate the cam extension valve is repeated. If the cam cylinder extend pressure is low, a test is made to determine if the cam cylinders are retracted. This is accomplished by testing the state of the electrical signals produced or controlled by the cam extended and retracted proximity sensors 281 and 283. If the cam cylinders are not retracted, the previously described steps starting with the command to deactivate the cam extension valve are repeated. If the cam cylinders are retracted, the program exits the initialize stringer clamp end effector subroutine and shifts to the pick-up stringer clip subroutine illustrated in FIG. 17.

The first two steps of the pick-up stringer clip subroutine are conducted by the CC machine tool that controls the position of the stringer clip end effector and a part presenter that presents parts to be picked up. Since these steps do not form part of the present invention, they are enclosed by dashed blocks in FIG. 17. After the CC machine tool has been instructed to move the stringer clip end effector into a pick-up position and receives confirmation that the stringer clip end effector has reached the pick-up position, the part presenter is instructed to align a clip for pick-up by the stringer clip end effector. Then, the clip clamp valve 243 is activated. Next, a test is made to determine if the clip clamp is pressurized. This is accomplished by testing the state of the electrical signal produced or controlled by the clip clamp pressure sensor 249. If the clip clamp is pressurized, the command to activate the clip clamp valve is repeated. If the clip clamp is not pressurized, which denotes that the movable and fixed jaws 45 and 47 are spaced apart, the CC machine tool is instructed to lower the stringer clip end effector over the clip that has been aligned for pick-up. Then, the clip clamp valve is deactivated, i.e., deenergized. Next, a test is made to determine if the clip clamp is pressurized. This is accomplished by testing the state of the electrical signal produced by the clip clamp pressure sensor 249. If the clip clamp is not pressurized, the command to deactivate the clip clamp valve is repeated. If the clip clamp is pressurized, the program exits the pick-up stringer clip subroutine illustrated in FIG. 17.

As shown in FIG. 18, after the CC machine tool has been instructed to move the stringer clip end effector to a suitable position adjacent to a prepositioned hat-shaped stringer, the cam extension valve 247 is activated to apply pressure via the cam vent pressure valve 259 to the extension ports 149a of the multimotion actuators 133. Next, a test is made to determine if the cam cylinder extend pressure is high. This is accomplished by testing the state of the electrical signal produced or controlled by the cam cylinder extended low-pressure sensor 261. If the cam extend pressure is not high, the command to activate, i.e., energize, the cam extension valve is repeated. If the cam extend pressure is high, a test is made to determine if the cam cylinders are extended. This is accomplished by testing the state of the electrical signal produced or controlled by the cam extended and retracted proximity sensors 281 and 283. If the cam cylinders are not extended, this cycle of steps is repeated starting with the command to activate the cam extension valve.

If the cam cylinders are extended, the cam rotation valve 245 is deactivated. This command occurs to make sure that the wide portion of the cam heads 131 lie parallel to the walls 27 and 29 of the hat-shaped stringer 31. This is the 0° position. After the command to deactivate the cam rotation valve occurs, a test is made to determine if the cams are at the 0° position. This is accomplished by testing the state of the electrical signals produced or controlled by the cam not-rotated and the cam rotated proximity sensors 285 and 287. If the cams are not at the 0° position, the command to deactivate, i.e., deenergize, the cam rotation valve 245 is repeated. If the cams are at 0° position, as illustrated by the dashed block in FIG. 18, the CC machine tool is instructed to move the stringer clip end effector downward into the stringer until the tips of the roller cams contact the lower surface. This results in the cams being lowered into the space between the walls 27 and 29 of the hat-shaped stringer. At this point, the clip still lies above the hat-shaped stringer.

Next, a test is made to determine if the cam cylinders are partially retracted. This is accomplished by testing the state of the signals produced (or controlled) by the cam cylinder extension and retraction proximity sensors 281 and 283. If the cam cylinders are not partially retracted, the CC machine tool instruction to move the stringer clip end effective toward the stringer is repeated.

After the cams bottom out in the stringer, which causes a partial retraction of the cam cylinders, the cam vent pressure valve 259 is activated, i.e., energized. This results in the venting of pressure applied to the extension ports 149a of the cam pneumatic actuators 133. As a result, the cams are free to "float" in the hat-shaped stringer. Next, a test is made to determine if the cam cylinder extended pressure is low. This is accomplished by testing the state of the cam cylinder extended low-pressure sensor 261. If the cam cylinder extended pressure is not low, the command to activate the cam vent pressure valve is repeated. If the cam extended pressure is low, the cam rotation valve 245 is activated, i.e., energized. This causes the cams to rotate through an arc of 90 degrees. That is, the cams rotate from their 0° position to their 90° position. This results in the walls of the hat-shaped stringer being spread apart (if necessary) by a predetermined amount, which is determined by the thickness of the cams. The thickness is, of course, determined by the distance between the outer surfaces of the walls 39 and 41 of the clip 23 to be inserted into the stringer cavity. Next, a test is made to determine if the cams are at their 90° positions. This is accomplished by testing the state of the electrical signals produced or controlled by the cam not-rotated and cam rotated proximity sensors 285 and 287. If the cams are not at their 90° positions, the command to activate the cam rotation valve is repeated.

Next, the CC machine tool is commanded to continue moving the stringer clip end effector downward into the stringer until the clip is inserted to the proper depth. Since the pressure applied to the extension ports 149a of the cam pneumatic actuators 133 is being vented, the shafts of the cam pneumatic actuators float inwardly as the stringer clip is inserted.

After the clip has been inserted to the proper depth, the cam rotation valve 245 is deactivated, i.e., deenergized. This results in the cams returning to their 0° position, i.e., the position whereat the thick dimension of the cams lies parallel to the longitudinal axis of the hat-shaped stringer. As a result, the walls 27 and 29 of the hat-shaped stringer 31 may move inwardly and grip the walls 39 and 41 of the clip 23, depending upon whether or not the walls were sprung slightly inwardly when the hat-shaped stringer was formed. In any event, after the command to deactivate the cam rotation valve occurs, a test is made to determine if the cams are at their 0° position. If the cams are not at their 0° position, the command to deactivate the cam rotation valve 245 is repeated.

When the cams reach their 0° position, the stringer clamp valve 267 is activated, i.e., energized. Then a test is performed to determine if the stringer close clamp pressure is high. This is accomplished by testing the state of the electrical signal produced or controlled by the stringer clamp low-pressure sensor 269. If the stringer close clamp pressure is not high, i.e., it is low, the command to activate the stringer clamp valve 267 is repeated. If the stringer clamp close pressure is high, a test is made to determine if the stringer clamps are open. This is accomplished by testing the state of the electrical signal produced or controlled by the stringer clamp extended proximity sensors 289. If the stringer clamps are open, the cycle is repeated starting with the command to activate the stringer clamp valve. If the stringer clamps are closed, which means that the walls 27 and 29 of the stringer 31 are clamped tightly against the walls 39 and 41 of the slip 23, the drill motor valve 221 is activated, i.e., energized. At the same time, the motor lube valve 225 is pulsed twice. The pulses cause the oil injector 231 to send a fixed volume of oil to the drill motor manifold 223. Next, the drill feed motor 209 is activated, i.e., energized, to move the drills inwardly, until the inner stop 211a is impinged upon by the lower rack 197. Thereafter, the drill feed motor 209 is activated to return the drills to their home position. That is, the drill feed motor is reversed. The home position is reached when the lower rack 197 hits the outer stop 211b. Thereafter, the drill motor valve 221 is deactivated. Then, the program exits the drill stringer and stringer clip subroutine illustrated in FIG. 18. As will be appreciated from the foregoing description, when this subroutine is completed, a clip has been suitably positioned in the stringer and holes have been drilled through the stringer and the clip.

As noted above, FIGS. 19 and 20 illustrate alternative withdraw end effector subroutines. The withdraw end effector subroutine illustrated in FIG. 19 is utilized when the stringer clip is to be left between the walls of the hat-shaped stringer. The withdraw end effector subroutine illustrated in FIG. 20 is used when the stringer clip is to be removed from the hat-shaped stringer and moved to a drop-off position.

The first step in the withdraw end effector subroutine, illustrated in FIG. 19, is to activate the clip clamp valve 243. As a result, pressure applied to the movable jaw 45 by the clip clamp pneumatic actuator 113 is removed. After jaw pressure is removed, the jaws can be moved away from the hat-shaped stringer 31 without withdrawing the stringer clip 23 from between the walls 27 and 29 of the stringer.

After the command to activate the clip clamp valve occurs, a test is made to determine if the clip clamp is pressurized. This is accomplished by testing the state of the electrical signal produced or controlled by the clip clamp pressure sensor 249. If clip clamp pressure is pressurized, which means that pressure is still being applied to press the movable jaw 45 against the fixed jaw 47, the command to activate the clip clamp valve is repeated. If the clip clamp is not pressurized, meaning that jaw pressure has been released, the CC machine tool is instructed to move the stringer clip end effector away from the stringer. Thereafter, the program exits the withdraw end effector subroutine illustrated in FIG. 19.

The first step in the withdraw end effector subroutine, illustrated in FIG. 20, is to deactivate the stringer clamp valve 267. Thereafter, a test is made to determine if stringer close clamp pressure is low. This is accomplished by testing the electrical signal produced or controlled by the stringer clamp low-pressure sensor 269 to determine if clamp pressure is low. If clamp pressure is not low, the command to deactivate the stringer clamp valve 267 is repeated. If stringer clamp close pressure is low, a test is made to determine if the stringer clamps are open. This is accomplished by testing the state of the electrical signal produced or controlled by the stringer clamp extended proximity sensors 289. If the stringer clamps are not open, the previously described sequence of steps is repeated starting with the command to deactivate the stringer clamp valve.

If the stringer clamps are open, the cam rotation valve 245 is activated. Activation of the cam rotation valve rotates the cams to their 90° position. Then a test is made to determine if the cams are at their 90° position. This is accomplished by testing the state of the electrical signals produced or controlled by the cam not-rotated and the cam rotated proximity sensors 285 and 287. If the cams are not at their 90° position, the command to activate the cam rotation valve is repeated. If the cams are at their 90° position, the CC machine tool is instructed to move the stringer clip away from the stringer. At this point, the clip is still being gripped by the stringer clip end effector, because the clip clamp valve 243 is not energized whereby the jaws 45 and 47 still grip the clip. As a result, the clip is moved away from the stringer. The amount of movement is small, just enough for the clip to clear the cavity in the hat-shaped stringer. The cams remain in the stringer cavity because at their 90° position they are positioned to spread the walls of the stringer.

After the clip is moved away from the stringer, the cam rotation valve 245 is deactivated. After the command to deactivate the cam rotation valve has occurred, a test is made to determine if the cams are at their 0° position. Again, this is accomplished by testing the state of the electrical signals produced or controlled by the cam not-rotated and cam rotated proximity sensors 285 and 287. If the cams are not at their 0° positions, the command to deactivate the cam rotation valve is repeated.

If the cams are at their 0° positions, the cam vent pressure valve 259 is deactivated. As a result, the cam extension actuators are no longer vented. Thereafter, the cam extension valve 247 is deactivated. As a result of this deactivation, the cams are retracted. Next, a test is made to determine if the cam cylinders are retracted. This is accomplished by testing the state of the electrical signal produced or controlled by the cam extended and cam retracted proximity sensors 281 and 283. If the cam cylinders are not retracted, the foregoing sequence of steps is repeated starting with the command to deactivate the cam vent pressure valve 259. If the cam cylinders are retracted, the CC machine tool is instructed to move the stringer clip end effector to a clip drop-off position. Thereafter, the clip clamp valve 243 is activated. As a result, the movable jaw 45 moves away from the fixed jaw 47 and the clip is dropped. Then, a test is made to determine if the clip clamp is still pressurized. This is accomplished by testing the state of the electrical signal produced or controlled by the clip clamp pressure sensor 249. If the clip clamp is still being pressurized, the command to activate the clip clamp valve is repeated. If the clip clamp is not pressurized, the program leaves the withdraw end effector subroutine.

As will be readily appreciated from the foregoing description, the invention provides a stringer clip end effector suitable for use with a computer-controlled (CC) machine tool. A stringer clip end effector, formed in accordance with the invention, automatically picks up a clip at a predetermined location, moves the clip to a position adjacent a stringer into which the clip is to be installed, inserts cams into the stringer cavity and rotates the cams to spread the walls of the stringer cavity where the clip is to be inserted. Thereafter, the clip is inserted into the stringer cavity, the cam pressure is released, and the walls of the stringer are pressed against the walls of the clip. Then, holes are drilled simultaneously through the walls of the stringer and the walls of the clip. Thereafter, the clip is either left between the walls of the stringer or moved to a drop-off position.

While a preferred embodiment of the invention has been illustrated and described, it will be appreciated that various changes can be made therein without departing from the spirit and scope of the invention. For example, rather than each drill including a separate motor, a common drive motor can be provided for all of the drills. Further, stringer clamp mechanisms other than the ones specifically illustrated and described can be utilized. Likewise, other types of actuators can be used to control the pressure applied to the jaws of the stringer clip end effector. Consequently, within the scope of the appended claims, it is to be understood that the invention can be practiced otherwise than as specifically described herein.

The embodiments of the invention in which an exclusive property or privilege is claimed are defined as follows:

1. An end effector suitable for attachment to a computer-controlled machine tool, said end effector comprising:
   (a) insertion means for inserting a first part in a cavity located in a second part, said cavity defined by opposed walls;
   (b) clamping means for applying a clamping force against the outer surfaces of said walls of said second part;
   (c) drilling means for drilling holes through the opposed walls of said second part and a first part located in the cavity defined by said opposed walls; and
   (d) control means for sequentially controlling the operation of said insertion means, said clamping means, and said drilling means such that:
      (i) said insertion means inserts a first part in said cavity in said second part;
      (ii) said clamping means clamps the walls of said second part against said first part; and
      (iii) said drilling means drills aligned attachment holes through the walls of said second part, into said first part.

2. An end effector as claimed in claim 1, wherein said insertion means includes jaw means for gripping said first part and inserting said first part in said cavity located in said second part.

3. An end effector as claimed in claim 2, wherein said insertion means also includes spreading means for spreading said opposed walls of said second part prior to said jaw means inserting said first part in said cavity.

4. An end effector as claimed in claim 3, wherein said spreading means includes first and second spreaders positionable in said cavity in said second part on opposite sides of where said first part is to be inserted in said cavity.

5. An end effector as claimed in claim 4, wherein said first and second spreaders each include rotatable cams suitable for insertion in said cavity, said rotatable cams being rotatable between a position whereat said cams do not spread the opposed walls of said second part outwardly and a position whereat said cams spread the opposed walls of said second part outwardly.

6. An end effector as claimed in claim 5, wherein said control means includes a pneumatic subsystem for pneumatically controlling the opening and closing of said jaws, the insertion of said rotatable cams in said cavity, and the rotation of said rotatable cams.

7. An end effector as claimed in claim 1, wherein said insertion means includes spreading means for spreading said opposed walls of said second part prior to said first part being inserted in said cavity.

8. An end effector as claimed in claim 7, wherein said spreading means includes first and second spreaders positionable in said cavity in said second part on opposite sides of where said first part is to be inserted in said cavity.

9. An end effector as claimed in claim 8, wherein said first and second spreaders each include rotatable cams suitable for insertion in said cavity, said rotatable cams being rotatable between a position whereat said cams do not spread the opposed walls of said second part outwardly and a position whereat said cams spread the opposed walls of said second part outwardly.

10. An end effector as claimed in claim 9, wherein said control means includes a pneumatic system for pneumatically controlling the insertion of said rotatable cams in said cavity, and the rotation of said rotatable cams.

11. An end effector as claimed in claim 1, wherein said clamping means comprises at least two pairs of aligned clamping elements, said pairs located on opposite sides of the center of where said first part is to be positioned in said cavity.

12. An end effector as claimed in claim 11, wherein said clamping means includes:
   two pairs of C-shaped arms, one of said clamping elements located on one end of each of said C-shaped arms; and
   means for moving said C-shaped arms toward one another to create a clamping force.

13. An end effector as claimed in claim 12, wherein said clamping means also comprises mounting means for rotatably supporting the ends of said C-shaped arms remote from said ends at which said clamping elements are located such that said arms are free-floating, whereby equal force is applied by said clamping elements when said C-shaped arms are moved toward one another by said means for moving said C-shaped arms toward one another to create a clamping force.

14. An end effector as claimed in claim 11, wherein said insertion means includes jaw means for gripping said first part and inserting said first part in said cavity located in said second part.

15. An end effector as claimed in claim 14, wherein said insertion means also includes spreading means for spreading said opposed walls of said second part prior to said jaw means inserting said first part in said cavity.

16. An end effector as claimed in claim 15, wherein said spreading means includes first and second spreaders positionable in said cavity in said second part on opposite sides of where said first part is to be inserted in said cavity.

17. An end effector as claimed in claim 16, wherein said first and second spreaders each include rotatable cams suitable for insertion in said cavity, said rotatable cams being rotatable between a position whereat said cams do not spread the opposed walls of said second part outwardly and a position whereat said cams spread the opposed walls of said second part outwardly.

18. An end effector as claimed in claim 17, wherein said control means includes a pneumatic subsystem for pneumatically controlling the opening and closing of said jaws, the insertion of said rotatable cams in said cavity, the rotation of said rotatable cams and the actuation of said two pairs of aligned clamping elements.

19. An end effector as claimed in claim 1, wherein said drilling means includes at least one drill bit facing the outer surface of at least one of said walls of said second part in alignment with said position in said second part where said first part is to be inserted in said cavity, drill means for rotating said at least one drill bit, and feed means for moving said at least one drill bit toward and away from said wall of said second part.

20. An end effector as claimed in claim 19, including a second drill bit facing the outer surface of the other wall of said second part in alignment with said position in said second part where said first part is to be inserted in said cavity and wherein said drill means rotates said second drill bit and said feed means moves said second drill bit toward and away from said other wall of said second part.

21. An end effector as claimed in claim 19, wherein said insertion means includes jaw means for gripping said first part and inserting said first part in said cavity located in said second part.

22. An end effector as claimed in claim 21, wherein said insertion means also includes spreading means for spreading said opposed walls of said second part prior to said jaw means inserting said first part in said cavity.

23. An end effector as claimed in claim 22, wherein said spreading means includes first and second spreaders positionable in said cavity in said second part on opposite sides of where said first part is to be inserted in said cavity.

24. An end effector as claimed in claim 23, wherein said first and second spreaders each include rotatable cams suitable for insertion in said cavity, said rotatable cams being rotatable between a position whereat said cams do not spread the opposed walls of said second part outwardly and a position whereat said cams spread the opposed walls of said second part outwardly.

25. An end effector as claimed in claim 24, wherein said control means includes a pneumatic subsystem for pneumatically controlling the opening and closing of said jaws, the insertion of said rotatable cams in said cavity, and the rotation of said rotatable cams.

26. An end effector as claimed in claim 19, wherein said clamping means comprises at least two pairs of aligned clamping elements, said pairs located on opposite sides of the center of where said first part is to be positioned in said cavity.

27. An end effector as claimed in claim 26, wherein said insertion means includes jaw means for gripping said first part and inserting said first part in said cavity located in said second part.

28. An end effector as claimed in claim 27, wherein said insertion means also includes spreading means for spreading said opposed walls of said second part prior to said jaw means inserting said first part in said cavity.

29. An end effector as claimed in claim 28, wherein said spreading means includes first and second spreaders positionable in said cavity in said second part on opposite sides of where said first part is to be inserted in said cavity.

30. An end effector as claimed in claim 29, wherein said first and second spreaders each include rotatable cams suitable for insertion in said cavity, said rotatable cams being rotatable between a position whereat said cams do not spread the opposed walls of said second part outwardly and a position whereat said cams spread the opposed walls of said second part outwardly.

31. An end effector as claimed in claim 30, wherein said control means includes a pneumatic system for pneumatically controlling the opening and closing of said jaws, the insertion of said rotatable cams in said cavity, and the rotation of said rotatable cams.

32. An end effector as claimed in claim 31, wherein said clamping means includes:
   two pairs of C-shaped arms, one of said clamping elements located on one end of each of said C-shaped arms; and
   means for moving said C-shaped arms toward one another to create a clamping force.

33. An end effector as claimed in claim 32, wherein said pneumatic system also pneumatically controls the movement of said C-shaped arms toward and away from one another and the rotation of said drill bits.

34. An end effector as claimed in claim 33, wherein said pneumatic subsystem includes pneumatic actuators for controlling the opening and closing of said jaw means, the insertion of said rotatable cams in said cavity, the rotation of said rotatable cams, the movement of said C-shaped arms toward and away from one another, and the rotation of said drill bits; said pneumatic system includes electrically operated pneumatic valves for controlling the application of pneumatic pressure to said pneumatic actuators; and said control means includes an electrical control system for controlling the operation of said electrically operated pneumatic valves.

* * * * *